United States Patent
Liu et al.

(10) Patent No.: US 12,275,417 B2
(45) Date of Patent: Apr. 15, 2025

(54) SYSTEM AND METHOD FOR IMPLEMENTING AUTOMOBILE ELECTRONIC CONTROL FUNCTION

(71) Applicant: SHENZHEN YINWANG INTELLIGENT TECHNOLOGIES CO., LTD., Shenzhen (CN)

(72) Inventors: Yalin Liu, Shanghai (CN); Xiaohua Chen, Shanghai (CN); Jianyong Cai, Shenzhen (CN); Xiaoqing Liu, Shanghai (CN)

(73) Assignee: Shenzhen Yinwang Intelligent Technologies Co., Ltd., Shenzhen (CN)

( * ) Notice: Subject to any disclaimer, the term of this patent is extended or adjusted under 35 U.S.C. 154(b) by 15 days.

(21) Appl. No.: 17/939,506

(22) Filed: Sep. 7, 2022

(65) Prior Publication Data

US 2023/0066378 A1 Mar. 2, 2023

Related U.S. Application Data

(63) Continuation of application No. 17/349,179, filed on Jun. 16, 2021, now Pat. No. 11,472,422, which is a
(Continued)

(30) Foreign Application Priority Data

Sep. 12, 2019 (CN) .......................... 201910867053.6

(51) Int. Cl.
*B60W 50/00* (2006.01)
(52) U.S. Cl.
CPC .............................. *B60W 50/0098* (2013.01)

(58) Field of Classification Search
CPC ..... B60W 50/0098; B60W 2050/0002; B60W 2050/0057; B60W 30/00; B60R 16/023; B60R 16/0232; B60R 16/03; Y02P 90/02
See application file for complete search history.

(56) References Cited

U.S. PATENT DOCUMENTS

2003/0144784 A1 7/2003 Tashiro et al.
2007/0067082 A1\* 3/2007 Watts ................ B60R 21/01516
701/1
(Continued)

FOREIGN PATENT DOCUMENTS

CN 202320155 U 7/2012
CN 105480168 A 4/2016
(Continued)

OTHER PUBLICATIONS

International Search Report issued in corresponding International Application No. PCT/CN2020/100385, dated Sep. 27, 2020, pp. 1-10.
(Continued)

*Primary Examiner* — Behrang Badii
(74) *Attorney, Agent, or Firm* — Leydig, Voit & Mayer, Ltd.

(57) ABSTRACT

A system for implementing an automobile electronic control function includes a plurality of automobile parts and an integrated unit VIU, and the VIU is configured to obtain control information of the plurality of automobile parts. The VIU is configured to control the plurality of automobile parts based on the control information. The plurality of automobile parts include automobile parts having only an execution function, and/or automobile parts having a part of an electronic control function and an execution function.

20 Claims, 16 Drawing Sheets

Related U.S. Application Data continuation of application No. PCT/CN2020/100385, filed on Jul. 6, 2020.

(56) References Cited

U.S. PATENT DOCUMENTS

| | | | |
|---|---|---|---|
| 2013/0158755 A1* | 6/2013 | Tang | H01M 10/48 700/29 |
| 2017/0336802 A1* | 11/2017 | Lin | G06F 9/50 |
| 2018/0275648 A1* | 9/2018 | Ramalingam | G01C 21/3438 |
| 2018/0334117 A1* | 11/2018 | Matsunaga | B60R 16/0207 |
| 2019/0190900 A1* | 6/2019 | Winkelvos | H04L 63/0876 |
| 2019/0215185 A1 | 7/2019 | Hellenthal | |
| 2019/0250611 A1* | 8/2019 | Costin | G05D 1/0242 |
| 2020/0159685 A1* | 5/2020 | Askeland | G06F 11/34 |
| 2020/0348713 A1* | 11/2020 | Griffey | G05G 5/03 |
| 2021/0347370 A1* | 11/2021 | Nemeth | B60T 8/885 |

FOREIGN PATENT DOCUMENTS

| | | | |
|---|---|---|---|
| CN | 107450518 | A | 12/2017 |
| CN | 108536122 | A | 9/2018 |
| CN | 108891409 | A | 11/2018 |
| CN | 109100159 | A | 12/2018 |
| CN | 109116777 | A | 1/2019 |
| CN | 109116844 | A | 1/2019 |
| CN | 109532719 | A | 3/2019 |
| CN | 209030252 | U | 6/2019 |
| CN | 110053487 | A | 7/2019 |
| DE | 102017204341 | A1 | 9/2017 |
| JP | 2004038766 | A | 2/2004 |
| JP | 2004136816 | A | 5/2004 |
| JP | 2004302944 | A | 10/2004 |
| JP | 2005075024 | A | 3/2005 |
| JP | 2006051922 | A | 2/2006 |
| JP | 2008210050 | A | 9/2008 |
| JP | 2017061278 | A | 3/2017 |
| JP | 2017178307 | A | 10/2017 |
| JP | 2018020609 | A | 2/2018 |
| KR | 101470206 | B1 | 12/2014 |

OTHER PUBLICATIONS

European Search Report issued in corresponding European Application No. 20864182.9, dated Dec. 10, 2021, pp. 1-6, European Patent Office, Munich, Germany.

Chinese Office Action issued in corresponding Chinese Application No. 201910867053.6, dated Dec. 6, 2021, pp. 1-9.

Japanese Office Action issued in corresponding Japanese Application No. 2021-528425, dated Jun. 6, 2022, pp. 1-4.

Korean Notice of Allowance issued in corresponding Korean Application No. 9-5-2023-035144424, dated Apr. 17, 2023, pp. 1-4.

* cited by examiner

SYSTEM AND METHOD FOR IMPLEMENTING AUTOMOBILE ELECTRONIC CONTROL FUNCTION

CROSS-REFERENCE TO RELATED APPLICATIONS

This application is a continuation of U.S. patent application Ser. No. 17/349,179, filed on Jun. 16, 2021, which is a continuation of International Application No. PCT/CN2020/100385, filed on Jul. 6, 2020. The International Application claims priority to Chinese Patent Application No. 201910867053.6, filed on Sep. 12, 2019. All of the aforementioned patent applications are hereby incorporated by reference in their entireties.

TECHNICAL FIELD

This application relates to the automobile field, and more specifically, to a system and a method for implementing an automobile electronic control function, and an automobile.

BACKGROUND

Nowadays, intelligentization, networking, electrification, and sharing have become development trends in the automobile field. The development trends are usually implemented based on a system for implementing an automobile electronic control function. Currently, the system for implementing the automobile electronic control function mainly includes a plurality of types of electronic control elements: a central computing platform (CCP), a domain control unit (DC), and an electronic control unit (ECU).

The CCP is configured to provide a data processing function for data of an entire automobile. The DC is configured to control a plurality of automobile parts in a functional domain. Generally, based on functions of the automobile parts, the DC may be classified into a power assembly domain controller, a vehicle safety domain controller, a vehicle body domain controller, an intelligent cockpit domain controller, an intelligent driving domain controller, and the like. The ECU is located in an automobile part and has an electronic control function. For example, the ECU may control the automobile part based on control information. For another example, the ECU may process to-be-transmitted data in the automobile part.

To adapt to the development trends in the automobile field, the automobile needs to implement more functions, and there are more electronic control elements, especially ECUs located in the automobile parts, in the system for implementing the automobile electronic control function. Usually, one or more ECUs are disposed in each automobile part having an electronic control function in the automobile, and each ECU needs to have a control function, a computing function, and the like. This causes high costs of the ECUs, and high costs of the automobile parts carrying the ECUs.

SUMMARY

This application provides a system and method for implementing an automobile electronic control function, and an automobile, to reduce costs of automobile parts in the automobile.

According to a first aspect, a system for implementing an automobile electronic control function is provided. The system includes a plurality of automobile parts and a vehicle integration unit (VIU). The VIU is in communication connection with the plurality of automobile parts, and the VIU is configured to obtain control information of the plurality of automobile parts; and the VIU is configured to control the plurality of automobile parts based on the control information, where the plurality of automobile parts include automobile parts having only an execution function, and/or automobile parts having a part of an electronic control function and an execution function.

In at least one embodiment of this application, the VIU controls the plurality of automobile parts. The plurality of automobile parts include the automobile parts having only the execution function, and/or the automobile parts having the part of the electronic control function and the execution function. In other words, the VIU implements some or all functions of ECUs in the plurality of automobile parts. Therefore, an ECU in each automobile part does not need to control the automobile part separately in an existing system for implementing an automobile electronic control function, to simplify functions of the ECUs in the automobile parts. This helps reduce costs of the ECUs in the automobile parts, and finally reduce costs of the automobile parts.

In another aspect, in the system for implementing the automobile electronic control function provided in this application, the plurality of automobile parts may be connected to one VIU, and connected to a DC by using the VIU. Therefore, each automobile part in the existing system for implementing the automobile electronic control function does not need to be connected to the DC by using a respective harness, and this helps reduce a length of the harness in the system for implementing the automobile electronic control function.

Optionally, the part of the electronic control function is a data processing function or a logic control function.

In at least one embodiment of this application, the automobile parts may have only the part of the electronic control function and the part of the electronic control function is the data processing function or the logic control function, or the automobile parts may have some functions implemented by an existing ECU. This helps simplify functions of the ECUs in the automobile parts, and reduces costs of the ECUs in the automobile part.

In a possible implementation, the plurality of automobile parts further include parts having the logic control function, the data processing function, and the execution function.

In at least one embodiment of this application, the VIU may be further compatible with existing automobile parts, in other words, the foregoing parts having the logic control function, the data processing function, and the execution function. This helps expand an application scenario of the VIU in this application.

In a possible implementation, the VIU is configured to implement some or all electronic control functions of the plurality of automobile parts.

In at least one embodiment of this application, the VIU is configured to implement some or all electronic control functions of the plurality of automobile parts, in other words, some or all electronic control functions of the plurality of automobile parts are centralized and then implemented by the VIU. This helps simplify functions of the ECU in the automobile part, to reduce costs of the ECU in the automobile part.

In a possible implementation, the plurality of automobile parts includes a first automobile part, and the first automobile part includes an execution element. The VIU is configured to send the control information to the execution element, and the control information is used to indicate the execution element to perform a first operation; and the execution element is configured to perform the first operation based on the control information.

In at least one embodiment of this application, the VIU may control the execution elements of the plurality of automobile parts to perform the first operation, in other words, the VIU may implement the control function of the ECUs in the plurality of automobile parts. This helps reduce costs of the automobile parts.

In a possible implementation, the plurality of automobile parts includes a second automobile part, and the second automobile part includes a sensitive element, where the VIU is configured to send the control information to the sensitive element, where the control information is used to indicate the sensitive element to perform a second operation; and the sensitive element is configured to perform the second operation based on the control information.

Optionally, if the foregoing automobile part is a sensor, the sensitive element is a sensitive element in the sensor.

In at least one embodiment of this application, the VIU may control the sensitive elements of the plurality of automobile parts to perform the first operation, in other words, the VIU may implement the control function of the ECUs in the plurality of automobile parts. This helps reduce costs of the automobile parts.

In a possible implementation, the system further includes a domain controller DC, and the DC is configured to send the control information to the VIU.

In a possible implementation, the system further includes a central computing platform CCP, and the CCP is configured to send the control information to the VIU.

In a possible implementation, the VIU is configured to generate the control information.

According to a second aspect, a system for implementing an automobile electronic control function is provided. The system includes a plurality of automobile parts, an integrated unit VIU, and an automobile control unit. The automobile control unit includes a domain controller DC or a central computing platform CCP. The VIU is in communication connection with the plurality of automobile parts, the VIU is in communication connection with the automobile control unit, the VIU is configured to obtain first data from the plurality of automobile parts, and the VIU is configured to send the first data to the automobile control unit. The plurality of automobile parts include automobile parts having only an execution function, and/or automobile parts having a part of an electronic control function and an execution function.

In at least one embodiment of this application, the VIU forwards the first data of the plurality of automobile parts to the automobile control unit. The plurality of automobile parts include the automobile parts having only the execution function, and/or the automobile parts having the part of the electronic control function and the execution function. In other words, the VIU implements some or all functions of ECUs in the plurality of automobile parts. Therefore, an ECU in each automobile part does not need to control the automobile part separately in an existing system for implementing an automobile electronic control function, to simplify functions of the ECUs in the automobile parts. This helps reduce costs of the ECUs in the automobile parts, and finally reduce costs of the automobile parts.

In another aspect, in the system for implementing the automobile electronic control function provided in this application, the plurality of automobile parts may be connected to one VIU, and connected to a DC by using the VIU. Therefore, each automobile part in the existing system for implementing the automobile electronic control function does not need to be connected to the DC by using a respective harness, and this helps reduce a length of the harness in the system for implementing the automobile electronic control function.

Optionally, the part of the electronic control function is a data processing function or a logic control function.

In at least one embodiment of this application, the automobile parts may have only the part of the electronic control function and the part of the electronic control function is the data processing function or the logic control function, or the automobile parts may have some functions implemented by an existing ECU. This helps simplify functions of the ECUs in the automobile parts, and reduces costs of the ECUs in the automobile parts.

In a possible implementation, the plurality of automobile parts further include parts having the logic control function, the data processing function, and the execution function.

In at least one embodiment of this application, the VIU may be further compatible with existing automobile parts, in other words, the foregoing parts having the logic control function, the data processing function, and the execution function. This helps expand an application scenario of the VIU in this application.

In a possible implementation, the VIU is configured to implement some or all electronic control functions of the plurality of automobile parts.

In at least one embodiment of this application, the VIU is configured to implement some or all electronic control functions of the plurality of automobile parts, in other words, some or all electronic control functions of the plurality of automobile parts are centralized and then implemented by the VIU. This helps simplify functions of the ECU in the automobile part, to reduce costs of the ECU in the automobile part.

In a possible implementation, the VIU is configured to: obtain second data from the plurality of automobile parts; and perform first processing on the second data to obtain the first data, where the first processing comprises one or more of the following operations: performing data processing on data of the automobile part, performing protocol conversion on the data of the automobile part, and encapsulating the data of the automobile part according to a transmission protocol.

In at least one embodiment of this application, the VIU processes the second data of the plurality of automobile parts to obtain the first data, in other words, the VIU replaces the ECUs in the plurality of automobile parts, to implement the foregoing processing function. This helps reduce costs of the ECUs in the automobile parts.

In a possible implementation, the plurality of automobile parts include a first automobile part, and the first automobile part is configured to: obtain third data; and perform second processing on the third data to obtain the first data, wherein the second processing includes one or more of the following operations: performing data processing on data, encapsulating the data according to a transmission protocol, and performing data format conversion on the data.

In at least one embodiment of this application, the first automobile part performs the second processing on the third data, and forwards processed data, namely, the first data, to the automobile control unit by using the VIU. This helps reduce a bundle length in the system for implementing the automobile electronic control function.

According to a third aspect, a method for implementing an automobile electronic control function is provided. The automobile includes a plurality of automobile parts and a vehicle integration unit VIU, and the VIU is in communication connection with the plurality of automobile parts. The method includes: The VIU obtains control information of the plurality of automobile parts; and the VIU controls the plurality of automobile parts based on the control information, where the plurality of automobile parts include automobile parts having only an execution function, and/or automobile parts having a part of an electronic control function and an execution function.

In at least one embodiment of this application, the VIU controls the plurality of automobile parts. The plurality of automobile parts include the automobile parts having only the execution function, and/or the automobile parts having the part of the electronic control function and the execution function. In other words, the VIU implements some or all functions of ECUs in the plurality of automobile parts. Therefore, an ECU in each automobile part does not need to control the automobile part separately in an existing system for implementing an automobile electronic control function, to simplify functions of the ECUs in the automobile parts. This helps reduce costs of the ECUs in the automobile parts, and finally reduce costs of the automobile parts.

In another aspect, in the system for implementing the automobile electronic control function provided in this application, the plurality of automobile parts may be connected to one VIU, and connected to a DC by using the VIU. Therefore, each automobile part in the existing system for implementing the automobile electronic control function does not need to be connected to the DC by using a respective harness, and this helps reduce a length of the harness in the system for implementing the automobile electronic control function.

In a possible implementation, the part of the electronic control function is a data processing function or a logic control function.

In at least one embodiment of this application, the automobile parts may have only the part of the electronic control function and the part of the electronic control function is the data processing function or the logic control function, or the automobile parts may have some functions implemented by an existing ECU. This helps simplify functions of the ECUs in the automobile parts, and reduces costs of the ECUs in the automobile part.

In a possible implementation, the plurality of automobile parts further include parts having the logic control function, the data processing function, and the execution function.

In at least one embodiment of this application, the VIU may be further compatible with existing automobile parts, in other words, the foregoing parts having the logic control function, the data processing function, and the execution function. This helps expand an application scenario of the VIU in this application.

In a possible implementation, the VIU is configured to implement some or all electronic control functions of the plurality of automobile parts.

In at least one embodiment of this application, the VIU is configured to implement some or all electronic control functions of the plurality of automobile parts, in other words, some or all electronic control functions of the plurality of automobile parts are centralized and then implemented by the VIU. This helps simplify functions of the ECU in the automobile part, to reduce costs of the ECU in the automobile part.

In a possible implementation, the plurality of automobile parts include a first automobile part, and the first automobile part includes an execution element. That the VIU controls the plurality of automobile parts based on the control information includes: The VIU sends the control information to the execution element, where the control information is used to indicate the execution element to perform a first operation; and the execution element performs the first operation based on the control information.

In at least one embodiment of this application, the VIU may control the execution elements of the plurality of automobile parts to perform the first operation, in other words, the VIU may implement the control function of the ECUs in the plurality of automobile parts. This helps reduce costs of the automobile parts.

In a possible implementation, the plurality of automobile parts include a second automobile part, and the second automobile part includes a sensitive element. That the VIU controls the plurality of automobile parts based on the control information includes: The VIU sends the control information to the sensitive element, where the control information is used to indicate the sensitive element to perform a second operation; and the sensitive element performs the second operation based on the control information.

In at least one embodiment of this application, the VIU may control the sensitive elements of the plurality of automobile parts to perform the second operation, in other words, the VIU may implement the control function of the ECUs in the plurality of automobile parts. This helps reduce costs of the automobile parts.

In a possible implementation, the method further includes a domain controller DC, and that the VIU obtains control information of the plurality of automobile parts includes: The DC sends the control information to the VIU.

In a possible implementation, the method further includes a central computing platform CCP, and that the VIU obtains control information of the plurality of automobile parts includes: The CCP sends the control information to the VIU.

In a possible implementation, that the VIU obtains control information of the plurality of automobile parts includes: The VIU generates the control information.

According to a fourth aspect, a method for implementing an automobile electronic control function is provided. The automobile includes a plurality of automobile parts, an integrated unit VIU, and an automobile control unit. The automobile control unit includes a domain controller DC or a central computing platform CCP. The VIU is in communication connection with the plurality of automobile parts, and the VIU is in communication connection with the automobile control unit. The method includes: The VIU obtains first data from the plurality of automobile parts; and the VIU sends the first data to the automobile control unit, where the plurality of automobile parts include automobile parts having only an execution function, and/or automobile parts having a part of an electronic control function and an execution function.

In at least one embodiment of this application, the VIU forwards the first data of the plurality of automobile parts to the automobile control unit. The plurality of automobile parts include the automobile parts having only the execution function, and/or the automobile parts having the part of the electronic control function and the execution function. In other words, the VIU implements some or all functions of ECUs in the plurality of automobile parts. Therefore, an ECU in each automobile part does not need to control the automobile part separately in an existing system for implementing an automobile electronic control function, to simplify functions of the ECUs in the automobile parts. This helps reduce costs of the ECUs in the automobile parts, and finally reduce costs of the automobile parts.

In another aspect, in the system for implementing the automobile electronic control function provided in this application, the plurality of automobile parts may be connected to one VIU, and connected to a DC by using the VIU. Therefore, each automobile part in the existing system for implementing the automobile electronic control function does not need to be connected to the DC by using a respective harness, and this helps reduce a length of the harness in the system for implementing the automobile electronic control function.

Optionally, the part of the electronic control function is a data processing function or a logic control function.

In at least one embodiment of this application, the automobile parts may have only the part of the electronic control function and the part of the electronic control function is the data processing function or the logic control function, or the automobile parts may have some functions implemented by an existing ECU. This helps simplify functions of the ECU in the automobile part, and reduces costs of the ECU in the automobile part.

In a possible implementation, the plurality of automobile parts further include parts having the logic control function, the data processing function, and the execution function.

In at least one embodiment of this application, the VIU may be further compatible with existing automobile parts, in other words, the foregoing parts having the logic control function, the data processing function, and the execution function. This helps expand an application scenario of the VIU in this application.

In a possible implementation, the VIU is configured to implement some or all electronic control functions of the plurality of automobile parts.

In at least one embodiment of this application, the VIU is configured to implement some or all electronic control functions of the plurality of automobile parts, in other words, some or all electronic control functions of the plurality of automobile parts are centralized and then implemented by the VIU. This helps simplify functions of the ECU in the automobile part, to reduce costs of the ECU in the automobile part.

In a possible implementation, that the VIU obtains first data from the plurality of automobile parts includes: The VIU obtains second data from the plurality of automobile parts; and the VIU performs first processing on the second data to obtain the first data, where the first processing includes one or more of the following operations: performing data processing on data of the automobile part, performing protocol conversion on the data of the automobile part, and encapsulating the data of the automobile part according to a transmission protocol.

In at least one embodiment of this application, the VIU processes the second data of the plurality of automobile parts to obtain the first data, in other words, the VIU replaces the ECUs in the plurality of automobile parts, to implement the foregoing processing function. This helps reduce costs of the ECUs in the automobile parts.

In a possible implementation, the plurality of automobile parts include a first automobile part, and the method further includes: The first automobile part obtains third data; and the first automobile part performs second processing on the third data to obtain the first data, where the second processing includes one or more of the following operations: performing data processing on data, encapsulating the data according to a transmission protocol, and performing data format conversion on the data.

In at least one embodiment of this application, the first automobile part performs the second processing on the third data, and forwards processed data, namely, the first data, to the automobile control unit by using the VIU. This helps reduce a bundle length in the system for implementing the automobile electronic control function.

According to a fifth aspect, this application further provides an automobile. The automobile includes the system for implementing the automobile electronic control function in any one of the first aspect to the second aspect.

According to a sixth aspect, a vehicle integration unit VIU is provided. The VIU may be a controller in an automobile, or may be a chip in an automobile. The VIU may include a processing unit and an obtaining unit. The processing unit may be a processor, and the obtaining unit may be an input/output interface. The VIU may further include a storage unit. The storage unit may be a memory. The storage unit is configured to store an instruction. The processing unit executes the instruction stored in the storage unit, so that the VIU performs the steps performed by the first VIU in the foregoing aspects.

Optionally, the storage unit may be a storage unit (for example, a register or a cache) in the VIU, or may be an external storage unit (for example, a read-only memory or a random access memory) of the VIU.

In the sixth aspect, that a memory is coupled to a processor may be understood as that the memory is located in the processor, or the memory is located outside the processor, so that the memory is independent of the processor.

According to a seventh aspect, a computer program product is provided. The computer program product includes computer program code, and when the computer program code is run on a computer, the computer is enabled to perform the methods in the foregoing aspects.

It should be noted that some or all of the computer program code may be stored in a first storage medium. The first storage medium may be encapsulated with a processor, or may be encapsulated separately from a processor. This is not specifically limited in at least one embodiment of this application.

According to an eighth aspect, a non-transitory computer-readable medium is provided. The non-transitory computer-readable medium stores program code, and when the computer program code is run on a computer, the computer is enabled to perform the methods in the foregoing aspects.

DESCRIPTION OF EMBODIMENTS

The following describes technical solutions of this application with reference to accompanying drawings.

Figure 1:
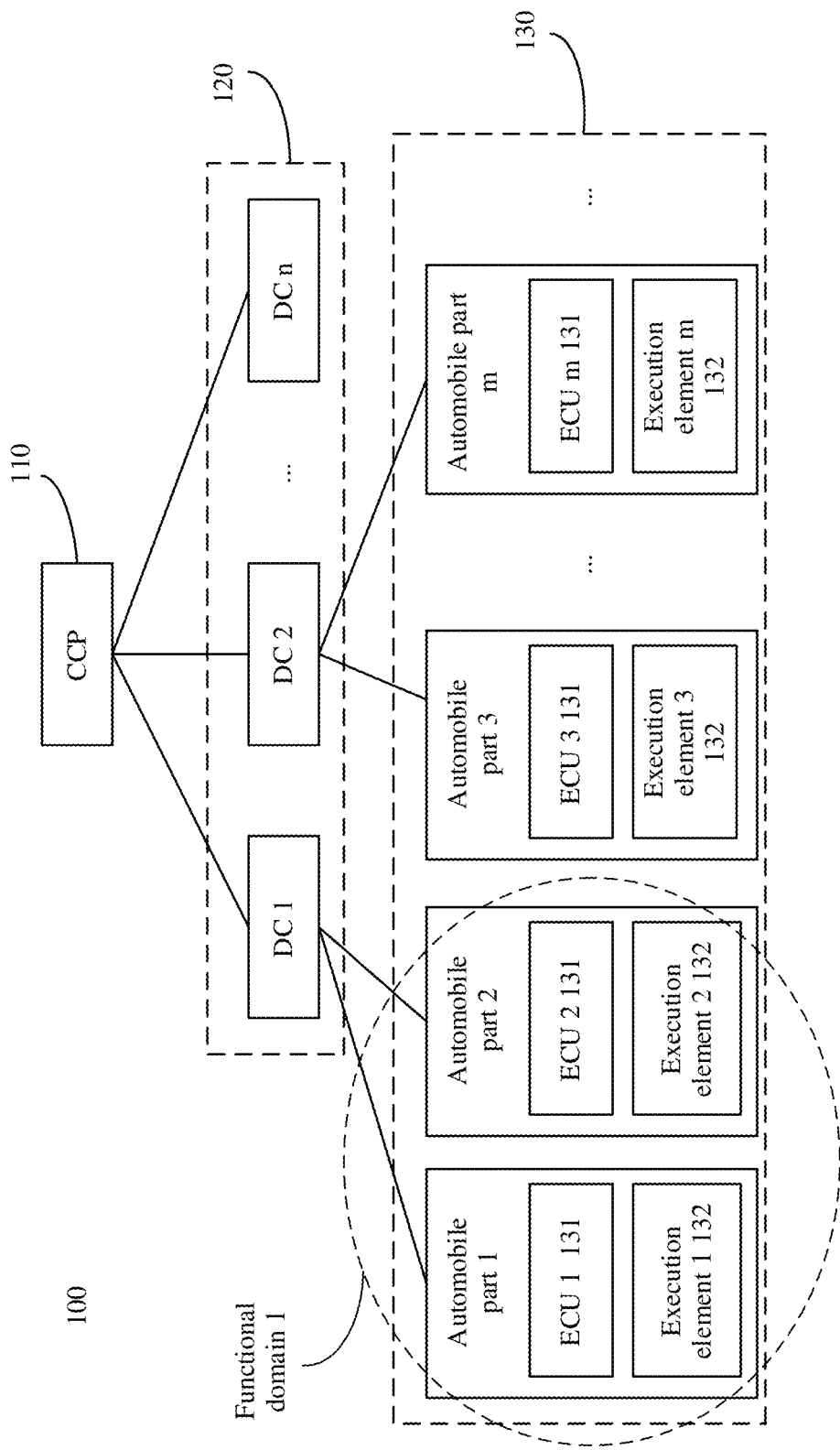
FIG. 1 is a schematic diagram of an existing system 100 for implementing an automobile electronic control function.

FIG. 1 is a schematic diagram of an existing system 100 for implementing an automobile electronic control function. As shown in FIG. 1, the system 100 includes a CCP 110, n DCs 120, and m automobile parts 130, where n and m are positive integers.

The CCP 110 is in communication connection with the n DCs, and may receive data sent by the DCs, or send control information to the DCs. The CCP 110 may be understood as a general platform for automobile electronic control and information processing. Distributed computing and control systems (for example, ECUs or DCs) in the automobile are optimized and integrated to implement network-based and integrated control and management of functional modules of automobile computing, control, and communication, and maximize real-time sharing of software and hardware resources, such as automobile computing and control.

Each DC 120 is configured to manage a functional domain in the automobile, in other words, the DC is in communication connection with a plurality of automobile parts located in the functional domain. The DC 120 is configured to control an automobile part in a corresponding functional domain, or provide a data processing function for an automobile part in a corresponding functional domain.

Functional domains are usually classified based on functions of automobile parts in the automobile, and each functional domain has an independent domain controller, namely, a DC. Generally, the DC in the automobile may include a self-driving domain controller, a cockpit domain controller (CDC), a vehicle domain controller (VDC), and the like.

The self-driving domain controller is configured to provide a service for automobile parts in an intelligent driving domain. The automobile parts in the intelligent driving domain include a monocular camera, a binocular camera, a millimeter-wave radar, a lidar, an ultrasonic radar, and the like.

It should be noted that a function of the foregoing self-driving domain controller may be implemented by a mobile data center (MDC) on the automobile or vehicle.

The CDC is configured to provide a service for automobile parts in a cockpit domain. The automobile parts in the cockpit domain include a head-up display, an instrument display, a radio, navigation, a surround camera lens, and the like.

The VDC is configured to provide a service for automobile parts in a vehicle body domain and automobile parts in a chassis domain. The automobile parts in the vehicle body domain include a door/window lifting controller, an electric rearview mirror, an air conditioner, a central door lock, and the like. The automobile parts in the chassis domain include an automobile part in a braking system, an automobile part in a steering system, a throttle, and the like.

The automobile part 130 may specifically include an ECU 131 and an execution element 132. For example, the execution element 132 may be a sensor and/or an actuator in the automobile part 130. Examples of sensors include, but are not limited to, an image sensor, a radar, an antenna, a GPS receiver, a door lock sensor, a temperature sensor, or the like. Examples of actuators include, but are not limited to, a display, a lens adjusting/focusing mechanism, a motor (e.g., for wiper, door, window, steering), a brake, a pump, a fan, a compressor, a valve, or the like. The automobile part 130 has an execution function to be performed by the execution element 132. In at least one embodiment, the automobile part 130 further has, in addition to the execution function, an electronic control function as described herein.

The ECU 131 is located in the automobile part, and is configured to provide an electronic control function for the automobile part. For example, the ECU 131 is an electronic control unit or circuit in a rain wiper, an electronic control unit or circuit located in an automobile door, and the like. An example of an ECU is an integrated circuit (IC).

The electronic control function mainly includes a logic control function and a data processing function. The logic control function includes controlling, based on the obtained control information, the automobile part to perform an operation (e.g., controlling the execution element 132 to execute the execution function), for example, controlling an action of the rain wiper based on the control information, for another example, controlling an on/off state of a door lock on the automobile door based on the control information. The data processing function includes processing to-be-processed data in the automobile part (e.g., processing data collected by the execution element 132, e.g., a sensor, executing the execution function). For example, the data processing function includes performing data fusion on weather information collected by using a sensible element (or sensor) of the rain wiper and running data of the rain wiper. For another example, the data processing function includes performing data fusion on fingerprint information obtained by using a sensible element (or sensor) of the door lock on the automobile door and on/off state information of the automobile door.

It should be noted that, unless otherwise specified, the ECU in at least one embodiment of this application refers to an electronic control element located in the automobile part, and is different from an "electronic control unit" (also referred to as an engine control unit) in existing approaches. The engine control unit is located outside a plurality of automobile parts in an engine system, is configured to control the plurality of automobile parts in the engine system, and may be considered as an independent centralized controller. However, the electronic control unit in at least one embodiment of this application, namely, an "ECU" below, indicates an electronic control unit located in the automobile part. For example, the electronic control units may be electronic control units located in the plurality of automobile parts in the engine system.

It should be noted that FIG. 1 shows only a possible implementation of a system for implementing an automobile electronic control function, and an existing system for implementing an automobile electronic control function may have another variation. For example, FIG. 2 shows another system 200 for implementing an automobile electronic control function, to be specific, the automobile part 130 no longer performs a communication connection with the CCP 110 by using the DC 120, but may directly perform a communication connection with the CCP 110.

Figure 2:
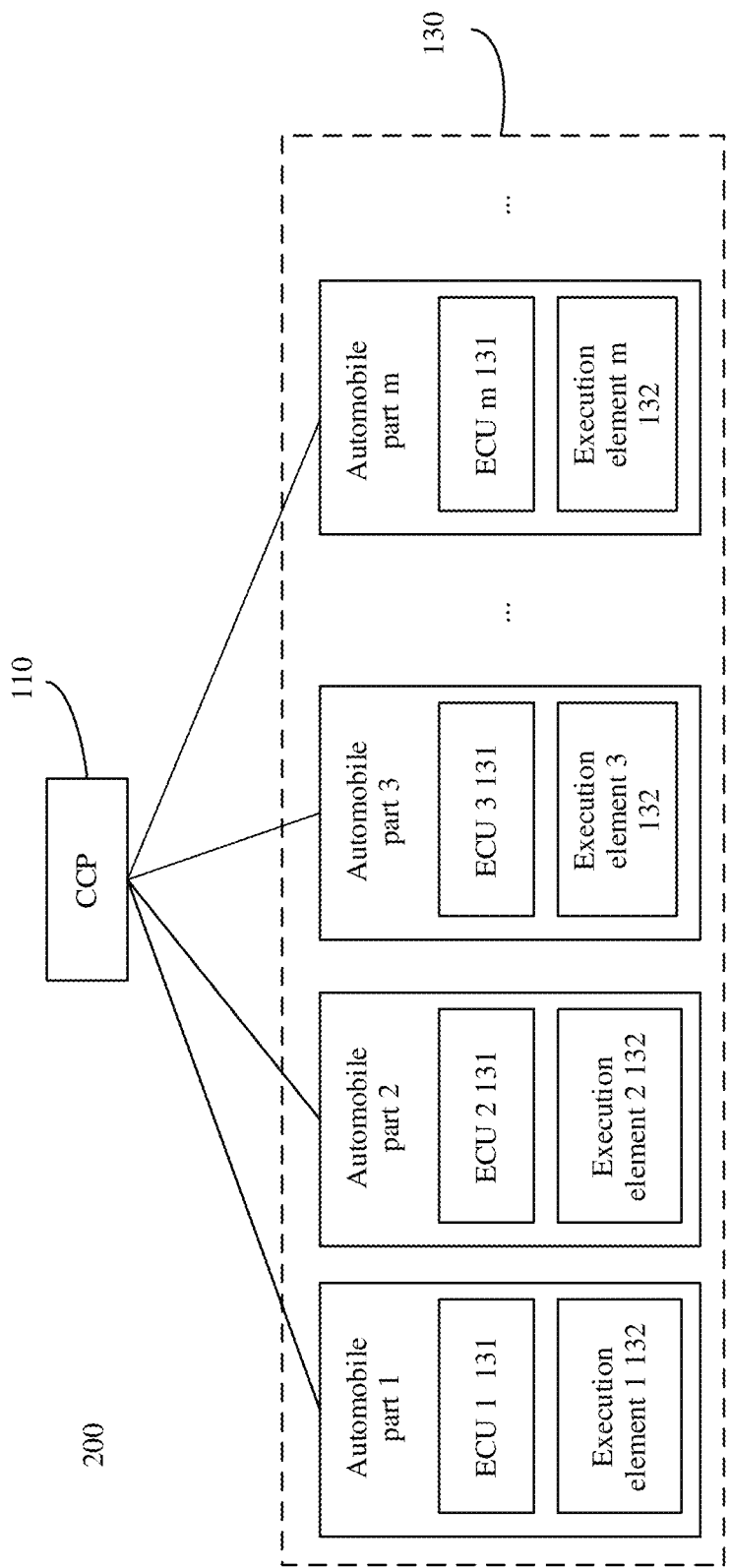
FIG. 2 is a schematic diagram of another existing system 200 for implementing an automobile electronic control function.

It should be understood that, in the system that is for implementing the automobile electronic control function and that is shown in FIG. 2, functions of components such as an automobile part and a CCP are similar to or the same as functions of components such as the automobile part and the CCP shown in FIG. 1. For brevity, details are not described herein again.

Either in the system that is for implementing the automobile electronic control function and that is shown in FIG. 1 or the system that is for implementing the automobile electronic control function and that is shown in FIG. 2, to implement electronization of the automobile and meet requirements for implementing various functions of the automobile, each automobile part has an independent ECU. The manner in which ECUs are distributively arranged results in higher costs of the automobile parts.

Besides, in the foregoing manner in which the ECUs are distributively arranged, a length of a harness used for communication between an ECU and a DC and a length of a harness used for communication between an ECU and a CCP in the system for implementing the automobile electronic control function are relatively large. This results in relatively high costs of the system for implementing the automobile electronic control function.

To avoid the foregoing problem, this application proposes a new system for implementing an automobile electronic control function, to be specific, a vehicle integration unit (VIU) is added to the system for implementing the automobile electronic control function. The VIU provides a complete or a part of a data processing function or a control function for the plurality of automobile parts. In this way, in a solution in which one VIU serves the plurality of automobile parts, an ECU in each automobile part does not need to implement the foregoing data processing function or control function in the existing system for implementing the automobile electronic control function. This helps reduce costs of the automobile parts.

In another aspect, in the system for implementing the automobile electronic control function provided in this application, the plurality of automobile parts may be connected to one VIU, and connected to a DC or a CCP by using the VIU. Therefore, each automobile part in the existing system for implementing the automobile electronic control function does not need to be connected to a DC or a CCP by using a respective harness, and this helps reduce the length of the harness in the system for implementing the automobile electronic control function.

Figure 3:
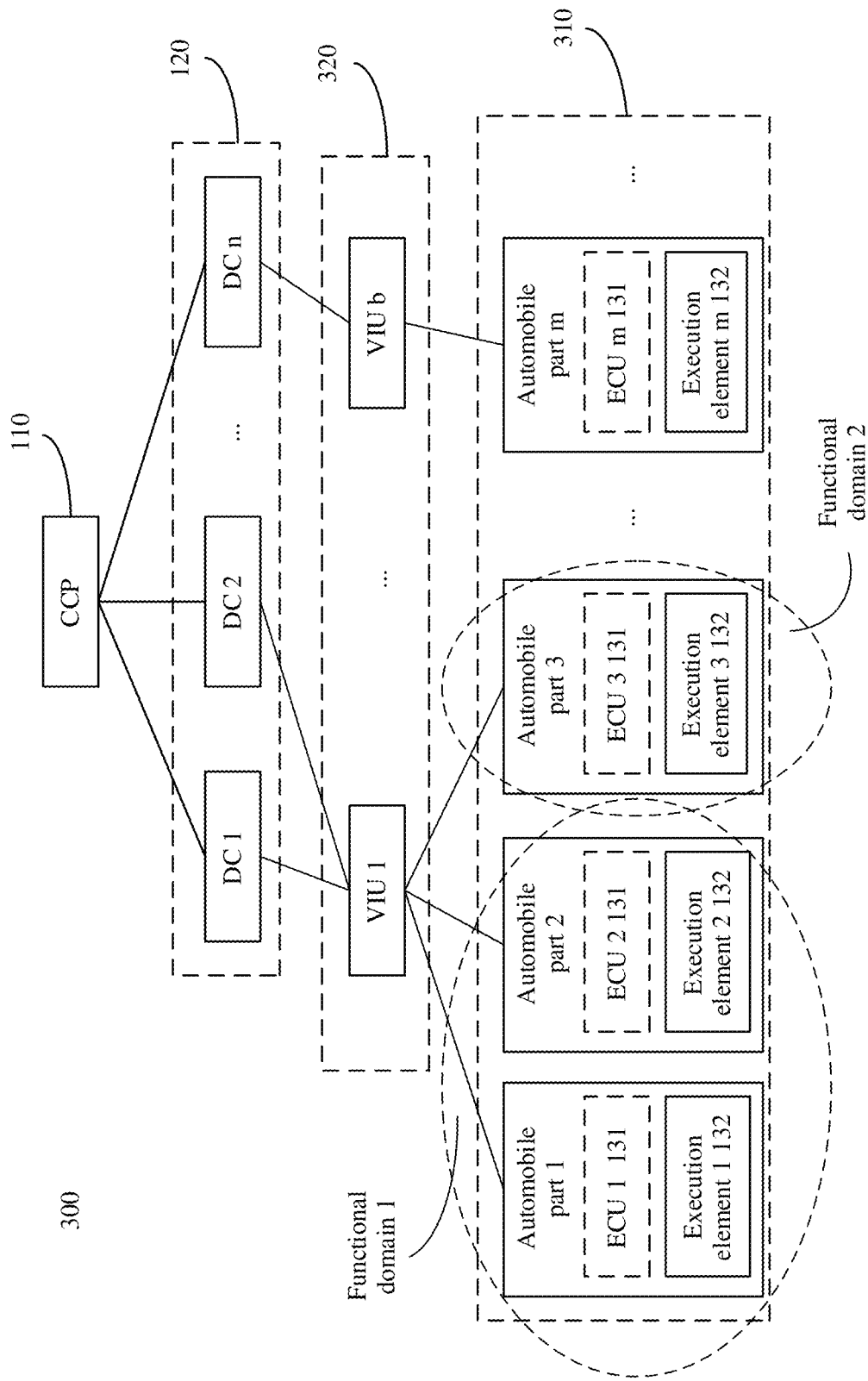
FIG. 3 is a schematic diagram of a system 300 for implementing an automobile electronic control function according to at least one embodiment of this application.
Figure 4:
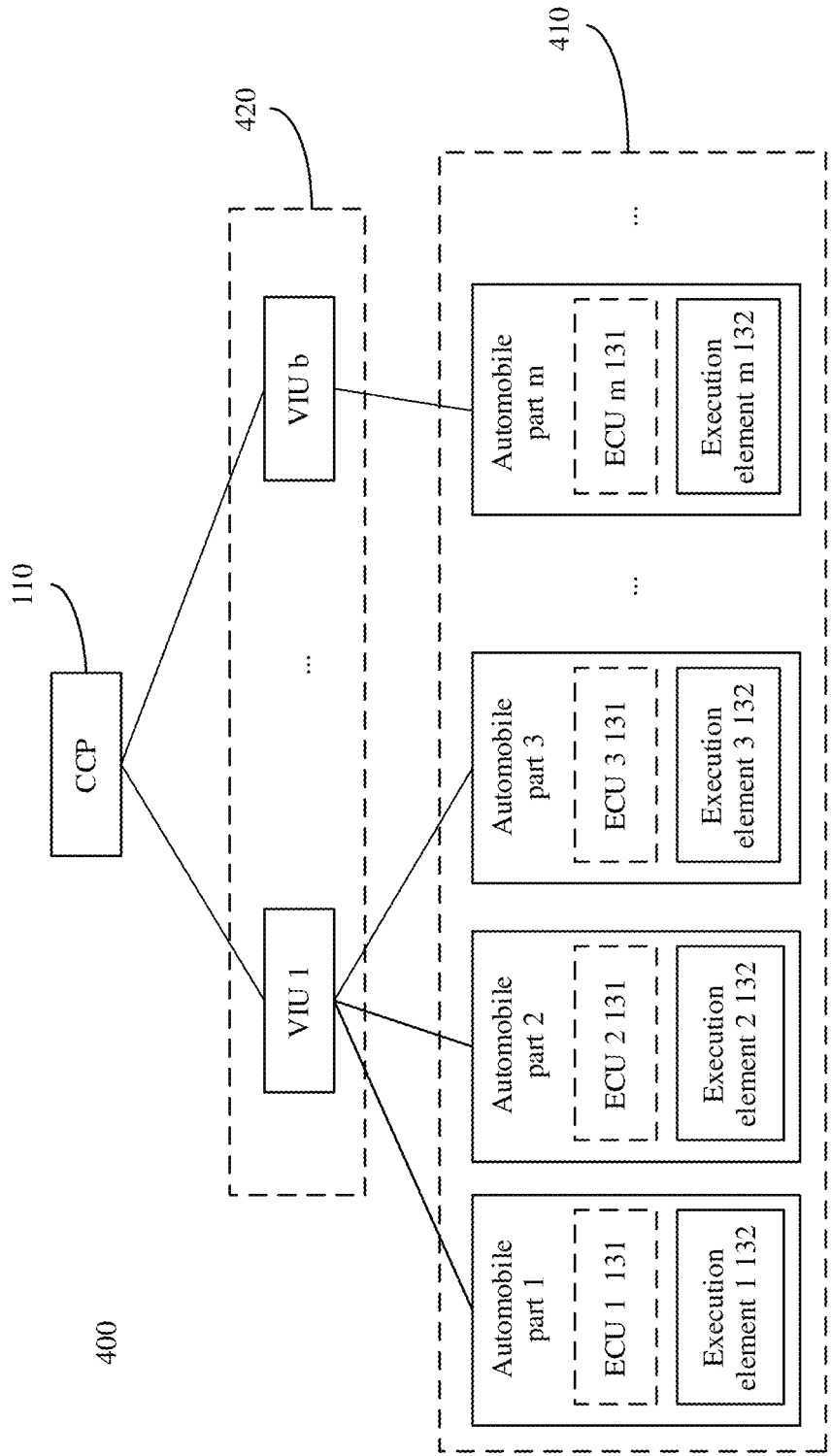
FIG. 4 is a schematic diagram of a system 400 for implementing an automobile electronic control function according to at least one embodiment of this application.

The following describes, with reference to FIG. 3 and FIG. 4, schematic diagrams of systems for implementing an automobile electronic control function according to this application. A system 300 that is for implementing an automobile electronic control function and that is shown in FIG. 3 may be understood as an improvement on the system 100 that is for implementing the automobile electronic control function and that is shown in FIG. 1. A system 400 that is for implementing an automobile electronic control function and that is shown in FIG. 4 may be understood as an improvement on the system 200 that is for implementing the automobile electronic control function and that is shown in FIG. 2.

It should be noted that, in some embodiments of this application, the system for implementing the automobile electronic control function may be applied to an intelligent automobile, a new energy automobile, an existing automobile, or the like. New energy automobiles include a pure electric automobile, an extended-range electric automobile, a hybrid electric automobile, a fuel cell electric automobile, a hydrogen engine automobile, or another new energy automobile. Examples of automobiles include a gasoline automobile, a diesel automobile, and the like. This is not limited in some embodiments of this application.

FIG. 3 is a schematic diagram of a system 300 for implementing an automobile electronic control function according to at least one embodiment of this application. It should be understood that units that have a same function in the system that is for implementing the automobile electronic control function and that is shown in FIG. 3 and the system that is for implementing the automobile electronic control function and that is shown in FIG. 1 use a same number. For brevity, details are not described herein.

The system 300, shown in FIG. 3, for implementing the automobile electronic control function includes a CCP 110, n DCs 120, m automobile parts 310, and b VIUs 320, where b, n, and m are positive integers.

The automobile part 310 may include one or more of the following automobile parts: an automobile part having a part of or a complete function of electronic control units ECUs; and an automobile part without an electronic control function.

It may be understood that the automobile part 310 having the complete electronic control function is the same as the automobile part 130 in FIG. 1.

It may be understood that the automobile part 310 having a part of the electronic control function has fewer electronic control functions than the automobile part 130 in FIG. 1.

It may be understood that the automobile part 310 without the part of the electronic control function is the automobile part 310 without an ECU.

The VIU 320 is in communication connection with the plurality of automobile parts 310, and is in communication connection with the DC in the automobile. For example, in FIG. 3, the VIU 1 is in communication connection with an automobile part 1, an automobile part 2, and an automobile part 3, and the VIU 1 is in communication connection with a DC 1 and a DC 2.

It should be noted that the communication connection may be understood as a wireless connection or a wired connection for information exchange. This is not limited in at least one embodiment of this application. It may be understood that the wireless connection is that the VIU does not need to communicate with another unit in the automobile through a bus. For example, Bluetooth communication, or Wi-Fi communication may be used. It may be understood that the wired connection is that the VIU communicates with another unit in the automobile based on the bus. For example, a controller area network (CAN) bus, a local interconnect network (LIN) bus, or an Ethernet communications technology may be used.

Optionally, the VIU may be in communication connection with a DC in the automobile. For example, a VIU b is in communication connection with a DC n shown in FIG. 3. The VIU may further be in communication connection with a plurality of DCs in the automobile. For example, a VIU 1 shown in FIG. 4 may be in communication connection with the DC 1 and DC 2.

In the existing system for implementing the automobile electronic control function, one DC usually communicates with a plurality of automobile parts in one functional domain. As shown in FIG. 1, the DC 1 may be in communication connection with an automobile part 1 and an automobile part 2 in a functional domain 1. To be compatible with the existing system for implementing the automobile electronic control function, a plurality of automobile parts belonging to one functional domain and a DC corresponding to the functional domain usually communicate with one VIU, so that the DC can control all automobile parts by using one VIU. This reduces changes to the existing electronic control function system.

Optionally, one VIU may serve any functional domain in the automobile. For example, in the system 300, shown in FIG. 3, for implementing the automobile electronic control function, the automobile part 1 and the automobile part 2 that have the communication connection with the VIU 1 belong to a same functional domain, namely, the functional domain 1. In addition, the DC 1 that is in communication connection with the VIU 1 is a DC corresponding to the functional domain 1.

The functional domain served by the VIU may be a vehicle domain. In this case, the VIU may be in communication connection with a VDC, an automobile part in a vehicle body domain, and an automobile part in a chassis domain. The functional domain served by the VIU may be a cockpit domain. In this case, the VIU may be in communication connection with a CDC and an automobile part in the cockpit domain. Alternatively, the functional domain served by the VIU may be an intelligent driving domain. In this case, the VIU may be in communication connection with an MDC and an automobile part in the intelligent driving domain.

Optionally, one VIU may also serve a plurality of functional domains. In other words, the VIU is in communication connection with automobile parts in the plurality of functional domains and DCs. For example, in the system 300, shown in FIG. 3, for implementing the automobile electronic control function, the DC 1 is a DC in the functional domain 1, the DC 2 is a DC in a functional domain 2, automobile parts in the functional domain 1 include the automobile part 1 and the automobile part 2, and an automobile part in the functional domain 2 is the automobile part 3. The VIU 1 is in communication connection with the DC 1 and the DC 2. In addition, the VIU 1 is also in communication connection with the automobile parts in the functional domain 1 and the automobile part in the functional domain 2.

The VIU may provide services for two functional domains. In other words, the VIU is in communication connection with automobile parts in the two functional domains and the DCs. The two functional domains may be any two functional domains in the automobile. For example, the foregoing two functional domains may be the vehicle domain and the cockpit domain. In this case, the DCs that are in communication connection with the VIU are the VDC and the CDC. Correspondingly, the automobile parts that are in communication connection with the VIU are the automobile parts in the vehicle body domain, the automobile parts in the chassis domain, and the automobile parts in the cockpit domain.

For another example, the foregoing two functional domains may be the vehicle domain and a mobile data center. In this case, the DCs that are in communication connection with the VIU are the VDC and the MDC. Correspondingly, the automobile parts that are in communication connection with the VIU are the automobile parts in the vehicle body domain, the automobile parts in the chassis domain, and the automobile parts in the intelligent driving domain.

For another example, the foregoing two functional domains may be the cockpit domain and a mobile data center. In this case, the DCs that are in communication connection with the VIU are the CDC and the MDC. Correspondingly, the automobile parts that are in communication connection with the VIU are the automobile parts in the cockpit domain and the automobile parts in the intelligent driving domain.

The VIU may provide services for three functional domains. In other words, the VIU is in communication connection with automobile parts in the three functional domains and the DCs. For example, the three functional domains may be the vehicle domain, the cockpit domain, and the mobile data center. In this case, the DCs that are in communication connection with the VIU are the VDC, the CDC, and the MDC. Correspondingly, the automobile parts that are in communication connection with the VIU are the automobile parts in the vehicle body domain, the automobile parts in the chassis domain, the automobile parts in the cockpit domain, and the automobile parts in the intelligent driving domain.

Certainly, if an existing electronic function control architecture is not considered, there are many connection manners between the VIU and the automobile part and between the VIU and the DC. This is not limited in at least one embodiment of this application. For example, a DC corresponding to a functional domain and an automobile part in the functional domain may be connected to different VIUs. For another example, the VIU is in communication connection with only some automobile parts in a functional domain. For another example, an automobile part served by the VIU may have no relationship with a functional domain. The automobile part served by each VIU may be determined based on another factor such as a physical position of the automobile part in the automobile.

FIG. 4 is a schematic diagram of a system 400 for implementing an automobile electronic control function according to at least one embodiment of this application. It should be understood that units that have a same function in the system 400 that is for implementing the automobile electronic control function and that is shown in FIG. 4 and the system 100 that is for implementing the automobile electronic control function and that is shown in FIG. 1 use a same number. For brevity, details are not described herein.

The system 400 that is for implementing an automobile electronic control function and that is shown in FIG. 4 includes a CCP 110, n DCs 120, m automobile parts 410, and b VIUs 420, where b, n, and m are positive integers.

The automobile part 410 may include one or more of the following automobile parts: an automobile part having a part of or a complete function of electronic control units ECUs; and an automobile part without an electronic control function.

It may be understood that the automobile part 410 having the complete electronic control function is the same as the automobile part 130 in FIG. 1.

It may be understood that the automobile part 410 having a part of the electronic control function has fewer electronic control functions than the automobile part 130 in FIG. 1.

It may be understood that the automobile part 410 without the part of the electronic control function is the automobile part 410 without an ECU.

The VIU 420 is in communication connection with a plurality of automobile parts 410, and is in communication connection with the CCP 110 in the automobile. For example, in FIG. 4, a VIU 1 is in communication connection with an automobile part 1, an automobile part 2, and an automobile part 3, and the VIU 1 is in communication connection with the CCP 110.

It should be noted that the communication connection may be understood as a wireless connection or a wired connection. This is not limited in at least one embodiment of this application. It may be understood that the wireless connection is that the VIU does not need to communicate with another unit in the automobile through a bus. For example, Bluetooth communication, or Wi-Fi communication may be used. It may be understood that the wired connection is that the VIU communicates with the another unit in the automobile based on the bus. For example, a CAN bus, a LIN bus, or an Ethernet communications technology may be used.

Optionally, the VIU may provide a service for all or some automobile parts in the automobile. When the VIU provides the service for some automobile parts, another automobile part that is in the automobile and that is not in communication connection with the VIU may directly communicate with the CCP, or may communicate with the CCP by using another VIU. This is not limited in at least one embodiment of this application.

The foregoing separately describes, with reference to FIG. 3 and FIG. 4, the system 300 for implementing the automobile electronic control function and the system 400 for implementing the automobile electronic control function. The following mainly describes communication manners between a plurality of VIUs when the foregoing two electronic control architectures include the plurality of VIUs.

As described above, either in the system 300 that is for implementing the automobile electronic control function and that is shown in FIG. 3 or in the system 400 that is for implementing the automobile electronic control function and that is shown in FIG. 4, the automobile may include one or more VIUs. When the automobile includes one VIU, the VIU may provide a service for all or some automobile parts in the automobile. When an automobile includes a plurality of VIUs, different VIUs in the plurality of VIUs may provide services for different automobile parts, or different VIUs in the plurality of VIUs may provide services for at least partially same automobile parts.

To improve flexibility and reliability of information (including data or control information) transmission in the system for implementing the automobile electronic control function, the plurality of VIUs may communicate with each other. A specific communication manner may be a bus-based communication manner. For example, the VIU communicates with another VIU in the automobile based on the CAN bus. For another example, the VIU communicates with another VIU in the automobile based on the LIN bus. For another example, the VIU communicates with another VIU in the automobile based on a high-speed communication protocol. The high-speed communication protocol may be an Ethernet communication protocol. The foregoing communication manner may also be a wireless communication manner. For example, the VIU may communicate with the another VIU in the automobile based on a Bluetooth technology. For another example, the VIU may communicate with the another VIU in the automobile based on a Wi-Fi technology.

There are a plurality of communication connection manners for the plurality of VIUs. This is not specifically limited in some embodiments of this application. For example, there may be a communication connection between any two VIUs of the plurality of VIUs, or there is a communication connection between one VIU of the plurality of VIUs and the another VIU, or a ring communication network may be formed between the plurality of VIUs. A quantity of the plurality of VIUs is not specifically limited in at least one embodiment of this application. For example, the quantity may be 2, 3, 4, or 5.

Optionally, when the foregoing automobile includes the plurality of VIUs, a plurality of automobile parts served by each VIU may be obtained through classification based on one or more of the following factors: an interface type used by an automobile part in the automobile to transmit data, a transmission type used by the automobile part in the automobile to transmit data, and a manufacturer of the automobile part in the automobile, a type of the automobile part in the automobile, a security level of the automobile part in the automobile, a service type of a service to which the data transmitted by the automobile part in the automobile belongs, and a service level of the service to which the data transmitted by the automobile part in the automobile belongs.

Optionally, when the foregoing automobile includes the plurality of VIUs, the plurality of VIUs may back up each other according to a preset rule, or one of the plurality of VIUs is specially configured to provide a backup function for the another VIU. For a specific implementation process, refer to the following description.

As described above, to reduce costs of the automobile parts, some or all electronic control functions originally implemented by the ECUs in the plurality of automobile parts may be transferred to the VIU, the DC, or the CCP for implementation. There are many manners of transferring the electronic control functions. This may be not specifically limited in at least one embodiment of this application.

With reference to FIG. 5 to FIG. 11, the following first describes deployment solutions of electronic control functions of a plurality of automobile parts according to at least one embodiment of this application. In systems that are for implementing an automobile electronic control function and that are shown in FIG. 5 to FIG. 11, the complete electronic control function originally implemented by ECUs of the plurality of automobile parts is implemented by VIUs, or implemented by the ECUs of the plurality of automobile parts and VIUs. For ease of description, the complete electronic control function is divided into a first electronic control function (or a first part of the electronic control function) and a second electronic control function (or a second part of the electronic control function), in other words, the first electronic control function and the second electronic control function are combined to form the complete (or entire) electronic control function.

It should be understood that the complete electronic control function required by each automobile part may be different. The first electronic control function and the second electronic control function do not carry only a specific function, and are merely used to distinguish between the electronic control function implemented by the VIU and the electronic control function implemented by the ECU.

It should be noted that the systems that are for implementing an automobile electronic control function and that are shown in FIG. 5 to FIG. 11 may be used in combination with the system 300 for implementing the automobile electronic control function or the system 400 for implementing the automobile electronic control function. In other words, the VIU in FIG. 5 to FIG. 11 may be any VIU in the system 300 for implementing an automobile electronic control function or in the system 400 for implementing an automobile electronic control function, the plurality of automobile parts in FIG. 5 to FIG. 11 may be the automobile parts in the system 300 for implementing the automobile electronic control function or in the system 400 for implementing the automobile electronic control function.

Figure 5:
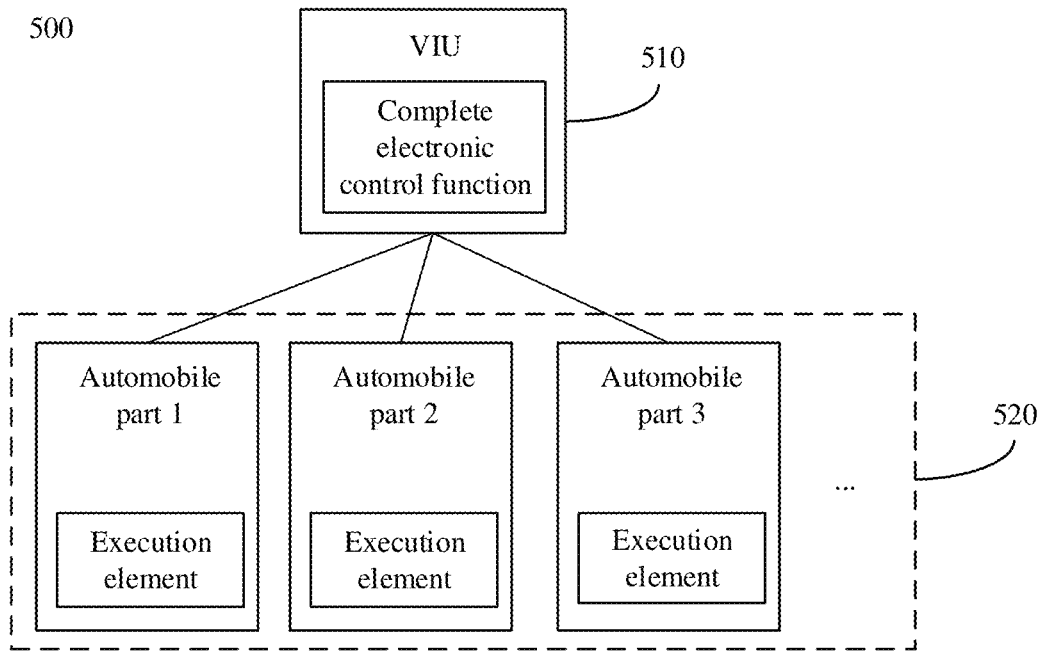
FIG. 5 is a schematic diagram of a system 500 for implementing an automobile electronic control function according to at least one embodiment of this application.

FIG. 5 is a schematic diagram of a system 500 for implementing an automobile electronic control function according to at least one embodiment of this application. A system 500 that is for implementing an automobile electronic control function and that is shown in FIG. 5 includes a VIU 510 and a plurality of automobile parts 520. The VIU 510 is in communication connection with the plurality of automobile parts 520, in other words, the VIU 510 can provide a complete electronic control function for the plurality of automobile parts 520. Correspondingly, the plurality of automobile parts 520 are automobile parts having only an execution function, or in other words, the plurality of automobile parts 520 no longer need to be configured with corresponding ECUs.

Figure 6:
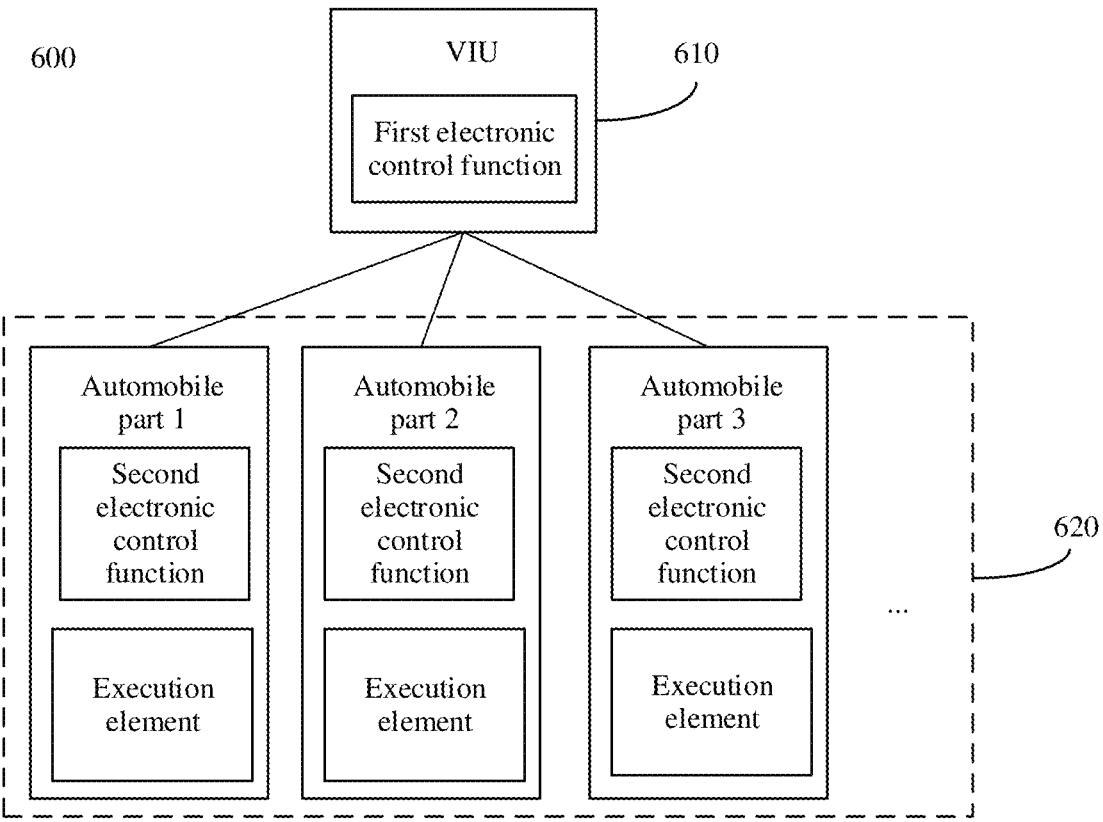
FIG. 6 is a schematic diagram of a system 600 for implementing an automobile electronic control function according to at least one embodiment of this application.

FIG. 6 is a schematic diagram of a system 600 for implementing an automobile electronic control function according to at least one embodiment of this application. A system 600 that is for implementing an automobile electronic control function and that is shown in FIG. 6 includes a VIU 610 and a plurality of automobile parts 620. The VIU 610 is in communication connection with the plurality of automobile parts 620, in other words, the VIU 610 may provide the first electronic control function for the plurality of automobile parts 620. Correspondingly, the plurality of automobile parts 620 are configured with respective ECUs, but each ECU is only configured to implement the second electronic control function. In this way, each ECU and the VIU may be combined to provide the complete electronic control function for the automobile parts.

It should be noted that electronic control implemented by ECUs in the plurality of automobile parts may be the same or different. This is not limited in at least one embodiment of this application.

Figure 7:
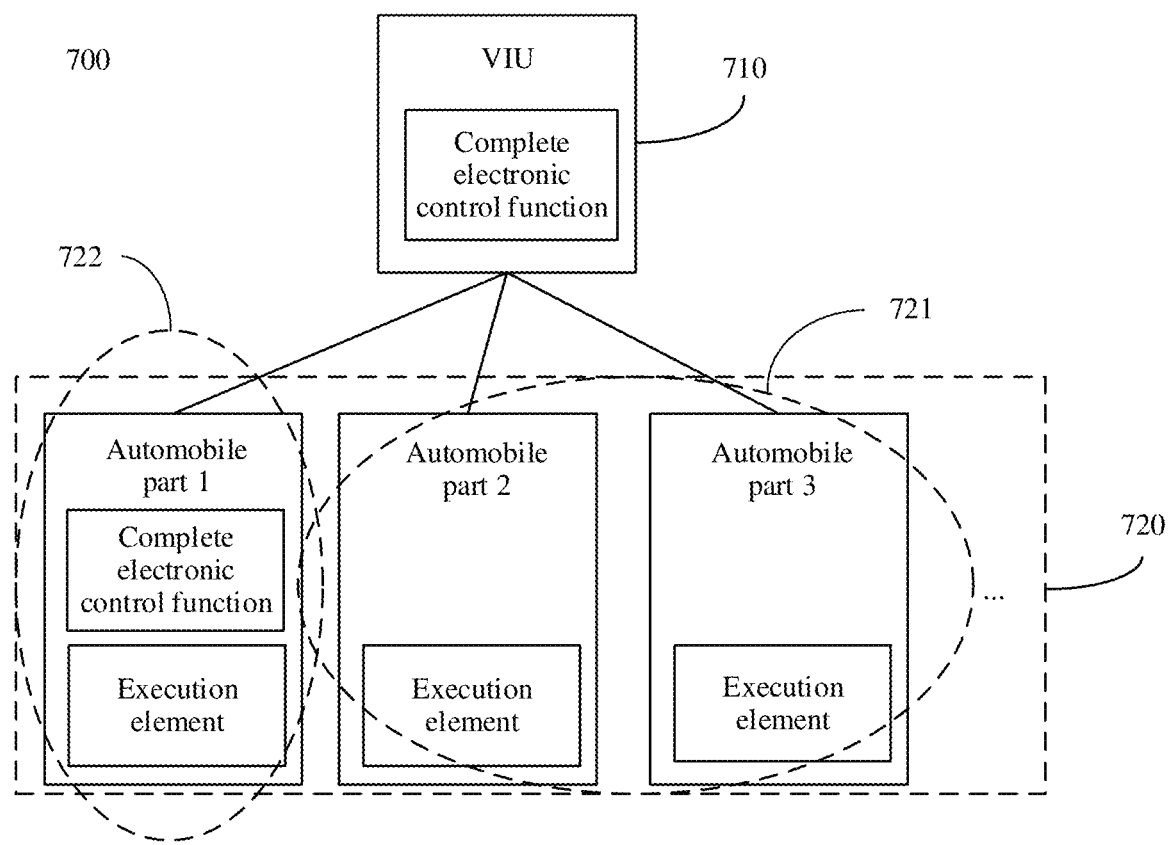
FIG. 7 is a schematic diagram of a system 700 for implementing an automobile electronic control function according to at least one embodiment of this application.

FIG. 7 is a schematic diagram of a system 700 for implementing an automobile electronic control function according to at least one embodiment of this application. A system 700 that is for implementing an automobile electronic control function and that is shown in FIG. 7 includes a VIU 710 and a plurality of automobile parts 720. The VIU 710 is in communication connection with the plurality of automobile parts 720. There are two types of automobile parts in the plurality of automobile parts 720. A first type of automobile parts 721 are automobile parts that have only an execution function, and a second type of automobile parts 722 are automobile parts that have ECUs.

The electronic control function required by the first type of automobile parts 721 may be implemented by the VIU, in other words, the first type of automobile parts 721 are the automobile parts having only the execution function, or the first type of automobile parts 721 no longer need to be configured with the corresponding ECUs. The ECUs in the second type of automobile parts 722 may provide the complete electronic control function without participation of the VIU.

Figure 8:
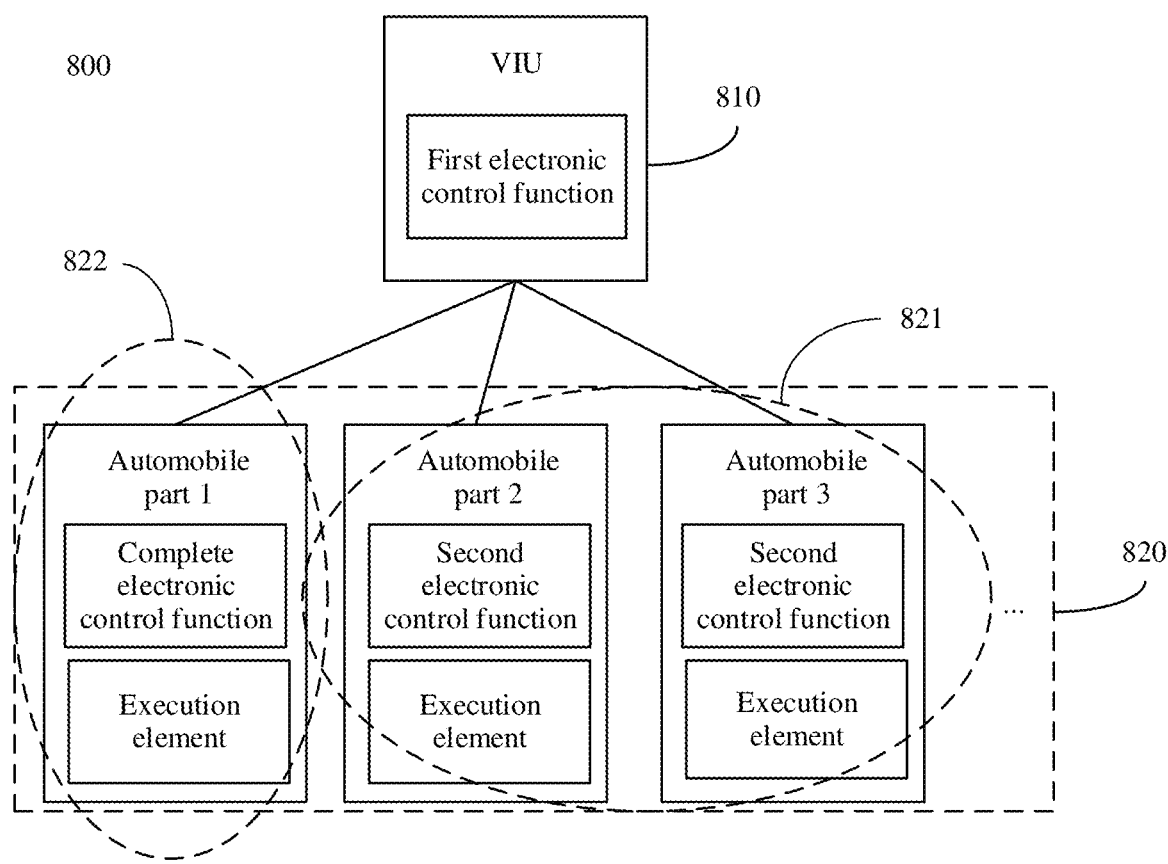
FIG. 8 is a schematic diagram of a system 800 for implementing an automobile electronic control function according to at least one embodiment of this application.

FIG. 8 is a schematic diagram of a system 800 for implementing an automobile electronic control function according to at least one embodiment of this application. A system 800 that is for implementing an automobile electronic control function and that is shown in FIG. 8 includes a VIU 810 and a plurality of automobile parts 820. The VIU 810 is in communication connection with the plurality of automobile parts 820. There are two types of automobile parts in the plurality of automobile parts 820. A first type of automobile parts 821 and a second type of automobile parts 822 are automobile parts that have ECUs.

Each ECU in the first type of automobile parts 821 is configured to implement only the second electronic control function. Correspondingly, the first electronic control function is implemented by the VIU. In this way, each ECU and the VIU may be combined to provide the complete electronic control function for a first automobile part.

The ECUs in the second type of automobile parts 822 may provide the complete electronic control function without participation of the VIU.

Figure 9:
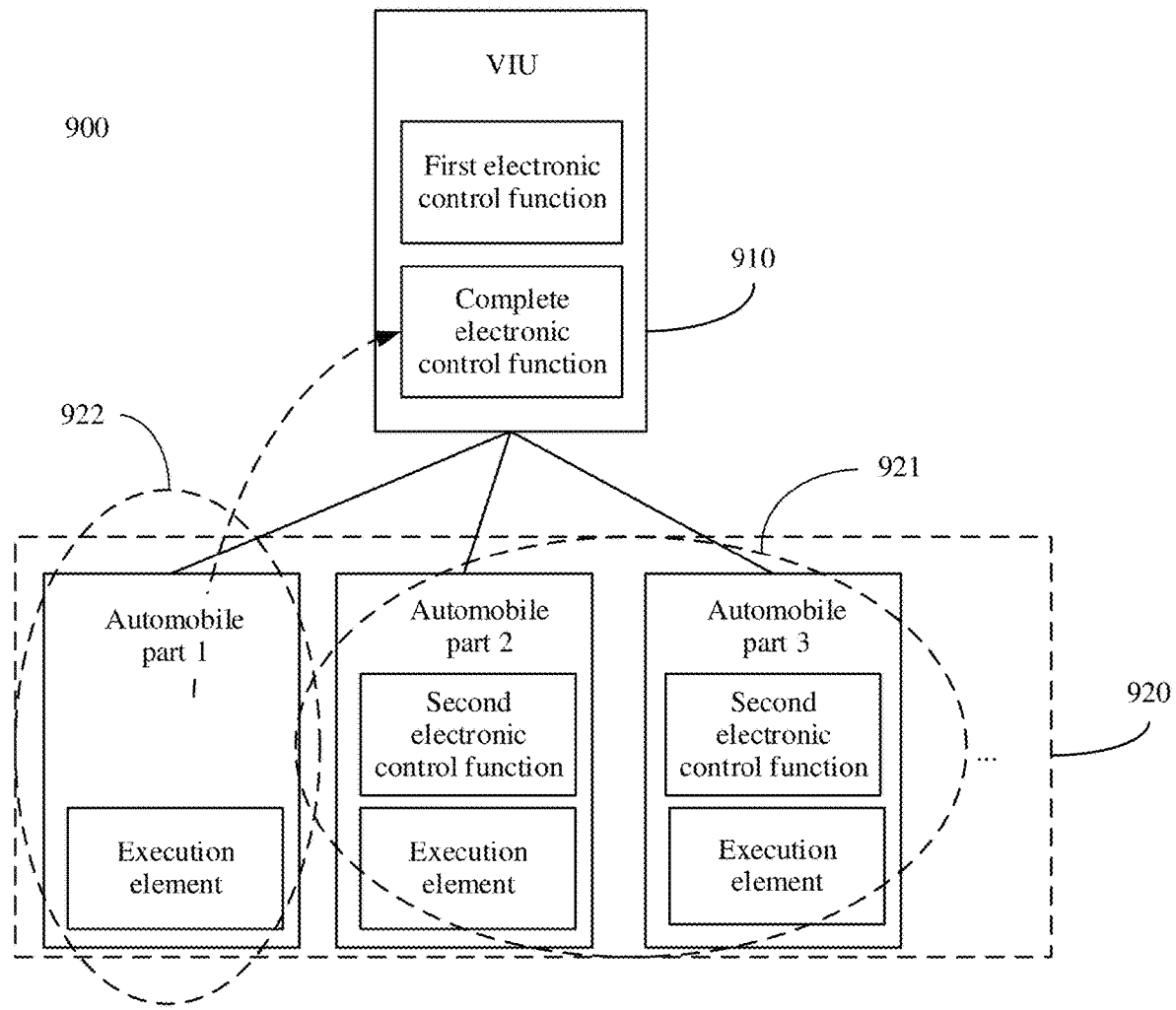
FIG. 9 is a schematic diagram of a system 900 for implementing an automobile electronic control function according to at least one embodiment of this application.

FIG. 9 is a schematic diagram of a system 900 for implementing an automobile electronic control function according to at least one embodiment of this application. A system 900 that is for implementing an automobile electronic control function and that is shown in FIG. 9 includes a VIU 910 and a plurality of automobile parts 920. The VIU 910 is in communication connection with the plurality of automobile parts 920. There are two types of automobile parts in the plurality of automobile parts 920. A first type of automobile parts 921 are automobile parts that are ECUs. Each ECU in the first type of automobile parts 921 is configured to implement only the second electronic control function. Correspondingly, the first electronic control function is implemented by the VIU. In this way, each ECU and the VIU may be combined to provide the complete electronic control function for a first automobile part.

The second type of automobile parts 922 are automobile parts having only an execution function, or the second type of automobile parts 922 does not need to be configured with corresponding ECUs, and the VIU implements the complete electronic control function required by the second type of automobile parts 922.

Figure 10:
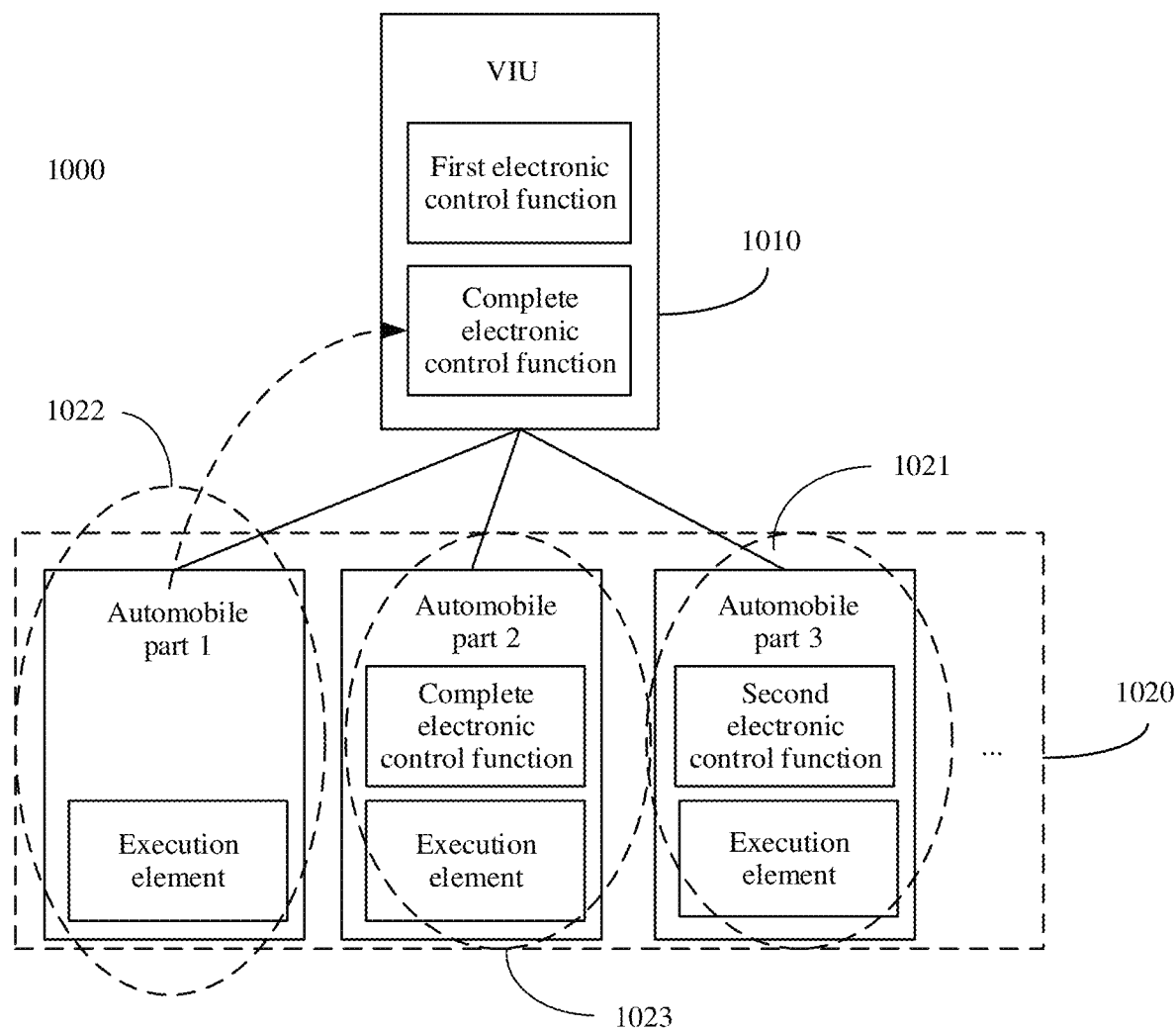
FIG. 10 is a schematic diagram of a system 1000 for implementing an automobile electronic control function according to at least one embodiment of this application.

FIG. 10 is a schematic diagram of a system 1000 for implementing an automobile electronic control function according to at least one embodiment of this application. A system 1000 that is for implementing an automobile electronic control function and that is shown in FIG. 10 includes a VIU 1010 and a plurality of automobile parts 1020. The VIU 1010 is in communication connection with the plurality of automobile parts 1020. There are three types of automobile parts in the plurality of automobile parts 1020.

A first type of automobile parts 1021 are automobile parts having ECUs, and each ECU is only configured to implement the second electronic control function. Correspondingly, the first electronic control function is implemented by the VIU. In this way, each ECU and the VIU may be combined to provide the complete electronic control function for a first automobile part.

A second type of automobile parts 1022 are automobile parts having only an execution function, or a second type of automobile parts 1022 no longer need to be configured with corresponding ECUs, and the VIU implements the complete electronic control function required by the second type of automobile parts 1022.

A third type of automobile parts 1023 are automobile parts that have the ECUs, and each ECU is configured to implement the complete electronic control function without participation of the VIU.

With reference to FIG. 11 to FIG. 17, the following describes deployment solutions of electronic control functions for a plurality of automobile parts according to at least one embodiment of this application. In the systems that are for implementing an automobile electronic control function and that are shown in FIG. 11 to FIG. 17, a complete electronic control function originally implemented by ECUs of the plurality of automobile parts is implemented by an automobile controller, or implemented by an automobile controller and a VIU. The automobile controller (or automobile control unit) includes a DC and a CCP. For ease of description, the complete electronic control function is divided into a first electronic control function and a second electronic control function, in other words, the first electronic control function and the second electronic control function are combined to form the complete electronic control function.

It should be understood that the complete electronic control function required by each automobile part may be different. The first electronic control function and the second electronic control function do not carry only a specific function, and are merely used to distinguish between the electronic control function implemented by the VIU and the electronic control function implemented by the ECU.

It should be noted that the systems that are for implementing the automobile electronic control function and that are shown in FIG. 11 to FIG. 17 may be used in combination with the system 300 for implementing the automobile electronic control function or the system 400 for implementing the automobile electronic control function. In other words, the VIU in FIG. 11 to FIG. 17 may be any VIU in the system 300 for implementing the automobile electronic control function or the system 400 for implementing the automobile electronic control function, the automobile controller in FIG. 11 to FIG. 17 may be the automobile controller (i.e., the CCP and/or DC(s)) in the system 300 for implementing the automobile electronic control function or the system 400 for implementing the automobile electronic control function.

In addition, in the systems that are for implementing the automobile electronic control function and that are shown in FIG. 11 to FIG. 17, a distribution manner of the electronic control function between the automobile controller and the VIU is mainly described. Therefore, only the VIU and the automobile controller are shown, and an automobile part connected to the VIU is not shown. The automobile part may be one or more of the foregoing three automobile parts. For brevity, details are not described herein again.

Figure 11:
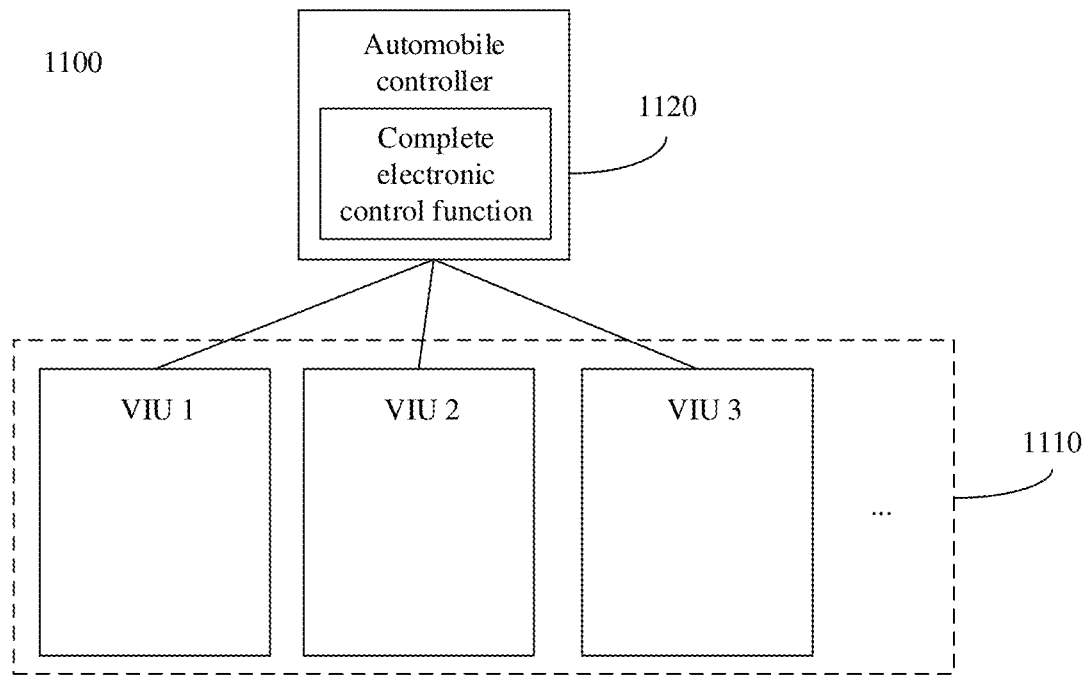
FIG. 11 is a schematic diagram of a system 1100 for implementing an automobile electronic control function according to at least one embodiment of this application.

FIG. 11 is a schematic diagram of a system 1100 for implementing an automobile electronic control function according to at least one embodiment of this application. The system 1100 that is for implementing the automobile electronic control function and that is shown in FIG. 11 includes a plurality of VIUs 1110 and an automobile controller 1120. The plurality of VIUs 1110 are in communication connection with the automobile controller 1120, and the automobile controller 1120 may provide a complete electronic control function. Correspondingly, the plurality of VIUs 1110 only have a forwarding function and do not have a data processing function.

Figure 12:
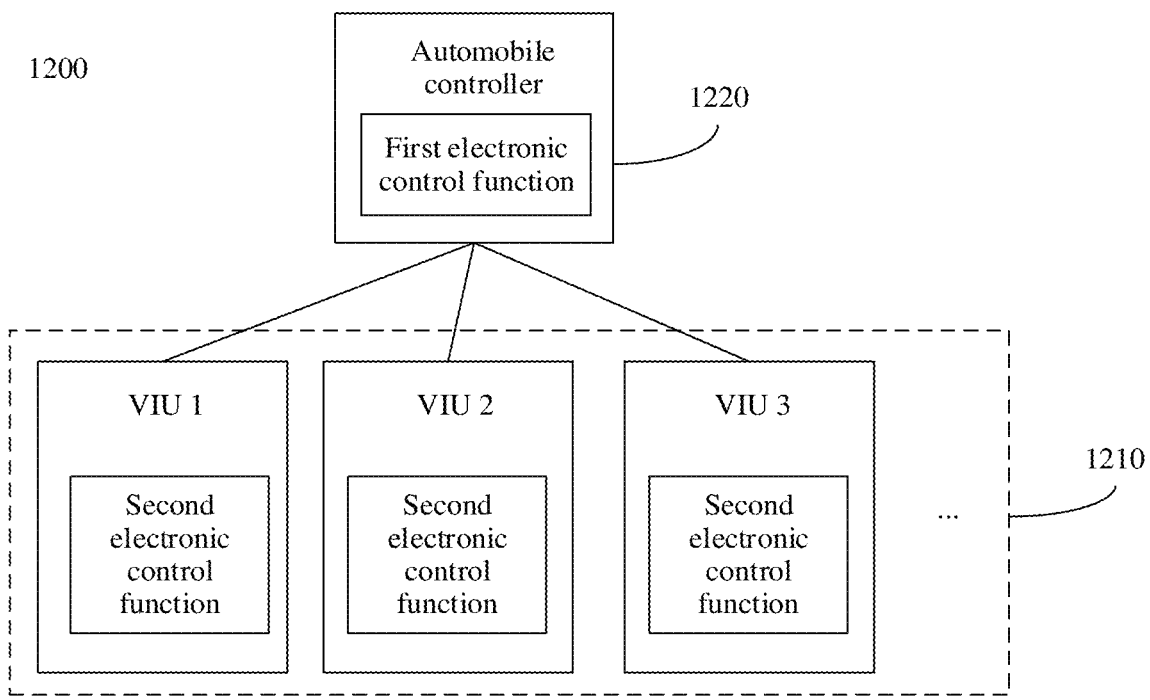
FIG. 12 is a schematic diagram of a system 1200 for implementing an automobile electronic control function according to at least one embodiment of this application.

FIG. 12 is a schematic diagram of a system 1200 for implementing an automobile electronic control function according to at least one embodiment of this application. The system 1200 that is for implementing the automobile electronic control function and that is shown in FIG. 12 includes a plurality of VIUs 1210 and an automobile controller 1220. The plurality of VIUs 1210 are in communication connection with the automobile controller 1220, and the automobile controller 1220 may provide a first electronic control function. Correspondingly, the plurality of VIUs 1210 may provide a second electronic control function. In this way, the automobile controller 1220 and the VIU 1210 may be combined to provide a complete electronic control function for an automobile part.

It should be noted that electronic control implemented by each VIU 1210 in a plurality of automobile parts may be the same or different. This is not limited in at least one embodiment of this application.

Figure 13:
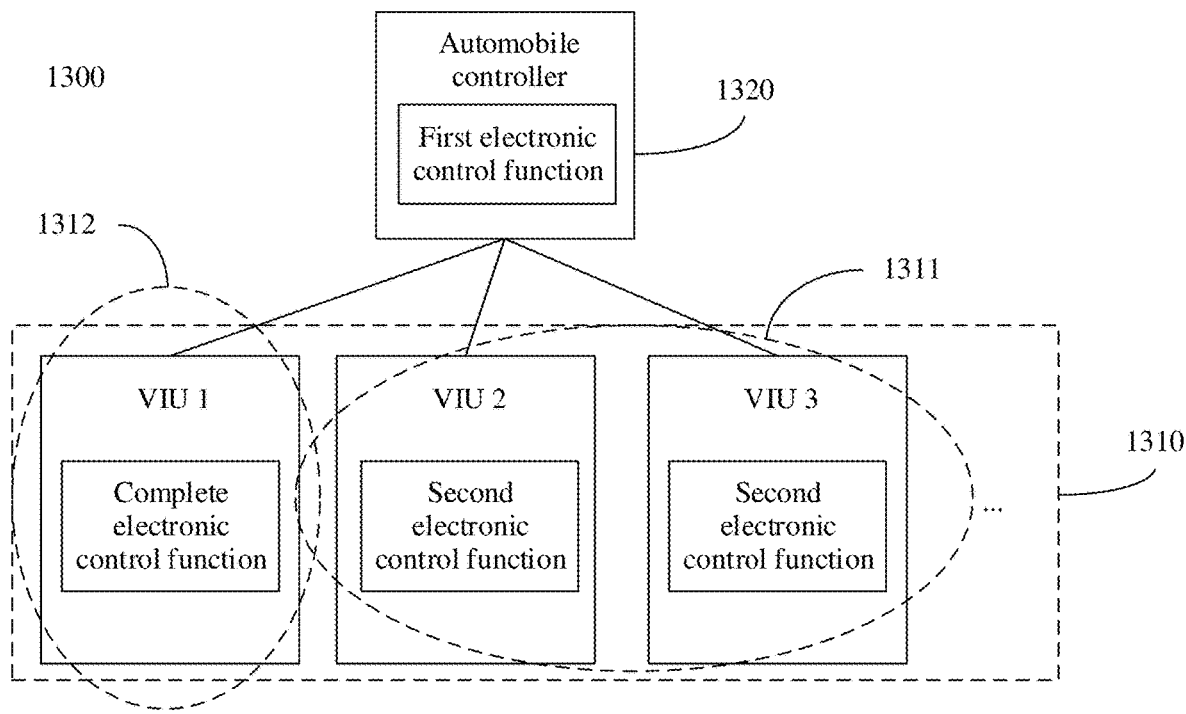
FIG. 13 is a schematic diagram of a system 1300 for implementing an automobile electronic control function according to at least one embodiment of this application.

FIG. 13 is a schematic diagram of a system 1300 for implementing an automobile electronic control function according to at least one embodiment of this application. The system 1300 that is for implementing the automobile electronic control function and that is shown in FIG. 13 includes a plurality of VIUs 1310 and an automobile controller 1320. The plurality of VIUs 1310 are in communication connection with the automobile controller 1320. There are two types of VIUs in the plurality of VIUs 1310. A first type of VIUs 1311 can provide a second electronic control function, and a second type of VIUs 1312 can provide a complete electronic control function. The automobile controller 1320 may provide a first electronic control function, to cooperate with the first type of VIUs 1311, to provide a complete electronic control function for an automobile part.

Figure 14:
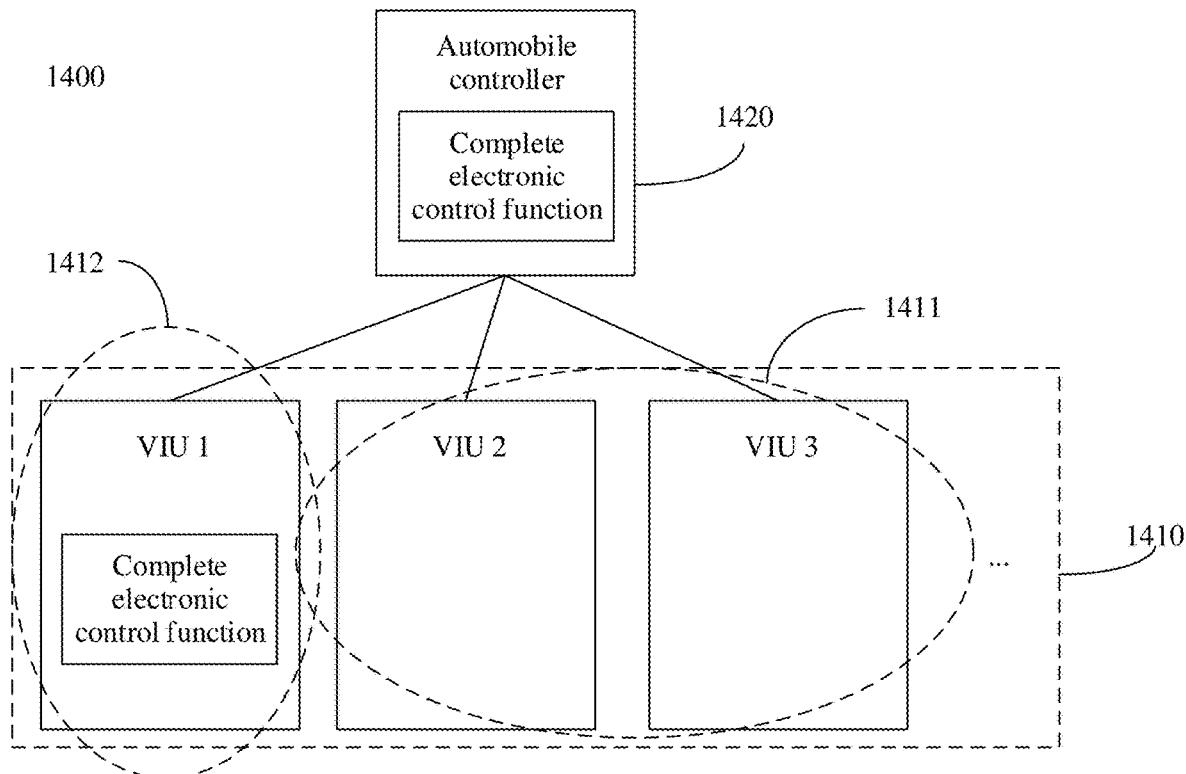
FIG. 14 is a schematic diagram of a system 1400 for implementing an automobile electronic control function according to at least one embodiment of this application.

FIG. 14 is a schematic diagram of a system 1400 for implementing an automobile electronic control function according to at least one embodiment of this application. The system 1400 that is for implementing the automobile electronic control function and that is shown in FIG. 14 includes a plurality of VIUs 1410 and an automobile controller 1420. The plurality of VIUs 1410 are in communication connection with the automobile controller 1420. There are two types of VIUs in the plurality of VIUs 1410. A first type of VIUs 1411 do not have the electronic control function, and are only configured to forward information. A second type of VIUs 1412 can provide a complete electronic control function. The automobile controller 1420 may provide the complete electronic control function, to cooperate with the first type of VIUs 1411 to provide the complete electronic control function for an automobile part.

Figure 15:
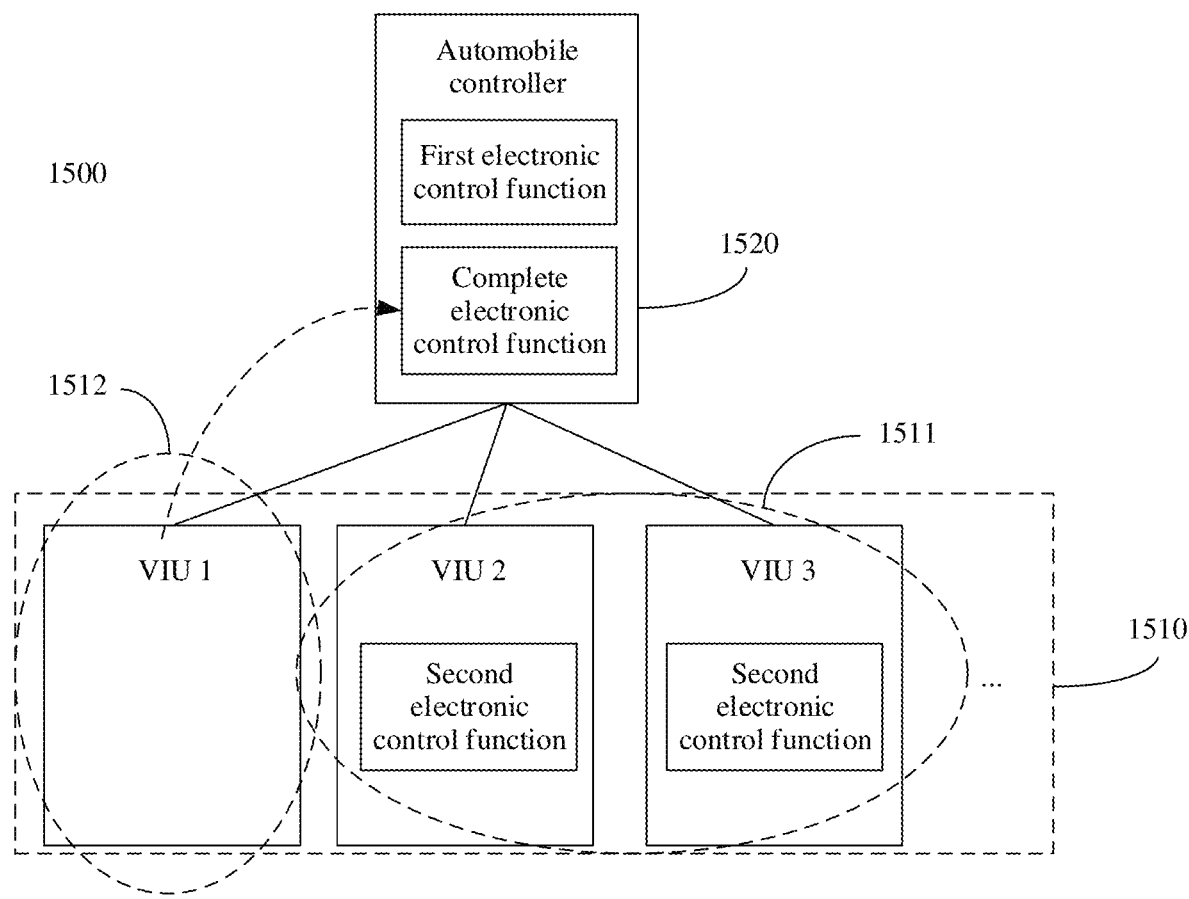
FIG. 15 is a schematic diagram of a system 1500 for implementing an automobile electronic control function according to at least one embodiment of this application.

FIG. 15 is a schematic diagram of a system 1500 for implementing an automobile electronic control function according to at least one embodiment of this application. The system 1500 that is for implementing the automobile electronic control function and that is shown in FIG. 15 includes a plurality of VIUs 1510 and an automobile controller 1520. The plurality of VIUs 1510 are in communication connection with the automobile controller 1520.

There are two types of VIUs in the plurality of VIUs 1510. A first type of VIUs 1511 do not have the electronic control function, and are only configured to forward information. A second type of VIUs 1512 may provide a second electronic control function.

The automobile controller 1520 may provide a complete electronic control function, to cooperate with the first type of VIUs 1511. The automobile controller 1520 may further provide a first electronic control function, to cooperate with the second type of VIUs 1512, to provide the complete electronic control function for an automobile part.

Figure 16:
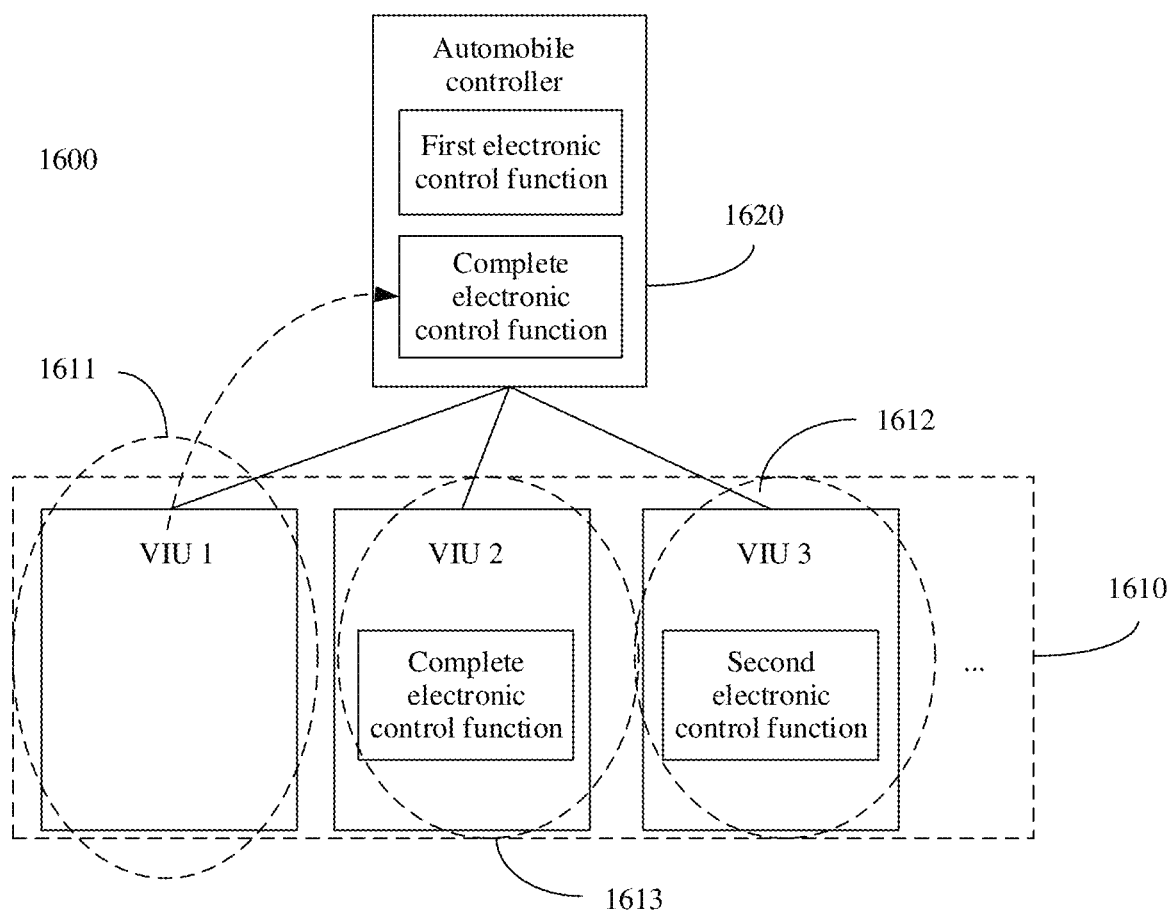
FIG. 16 is a schematic diagram of a system 1600 for implementing an automobile electronic control function according to at least one embodiment of this application.

FIG. 16 is a schematic diagram of a system 1600 for implementing an automobile electronic control function according to at least one embodiment of this application. The system 1600 that is for implementing the automobile electronic control function and that is shown in FIG. 16 includes a plurality of VIUs 1610 and an automobile controller 1620. The plurality of VIUs 1610 are in communication connection with the automobile controller 1620. The plurality of VIUs 1610 can be classified into three types. A first type of VIUs 1611 do not have the electronic control function, and are only configured to forward information. A second type of VIUs 1612 may provide a second electronic control function. A third type of VIUs 1613 can provide a complete electronic control function.

Correspondingly, the automobile controller 1620 may provide the complete electronic control function, to cooperate with the first type of VIUs 1611. The automobile controller 1620 may further provide a first electronic control function, to cooperate with the second type of VIUs 1612, to provide the complete electronic control function for an automobile part.

In the architectures described above with reference to FIG. 3 to FIG. 16, the VIU or the automobile controller needs to provide the electronic control functions for a plurality of automobile parts. The electronic functions may be provided separately or intelligently. That the electronic control functions required by the plurality of automobile parts are separately provided may be understood as that the electronic control functions required by the plurality of automobile parts are separately centralized in the VIU or the automobile controller, and the electronic control function required by each automobile part is separately implemented in the VIU or the automobile controller. For example, in the VIU or in the automobile controller, data for each automobile part is processed separately. The method for separately providing the electronic control function can simplify complexity of the electronic control function.

Generally, in order to improve a degree of integration between automobile parts, the foregoing method for intelligently providing the electronic control function may also be used. In other words, the electronic control functions required by the plurality of automobile parts are intelligently centralized in the VIU or the automobile controller, and the electronic control function required by each automobile part is implemented by the VIU or the automobile controller in the integrated manner. For example, in the VIU or the automobile controller, data fusion processing is performed on data of the plurality of automobile parts.

Figure 17:
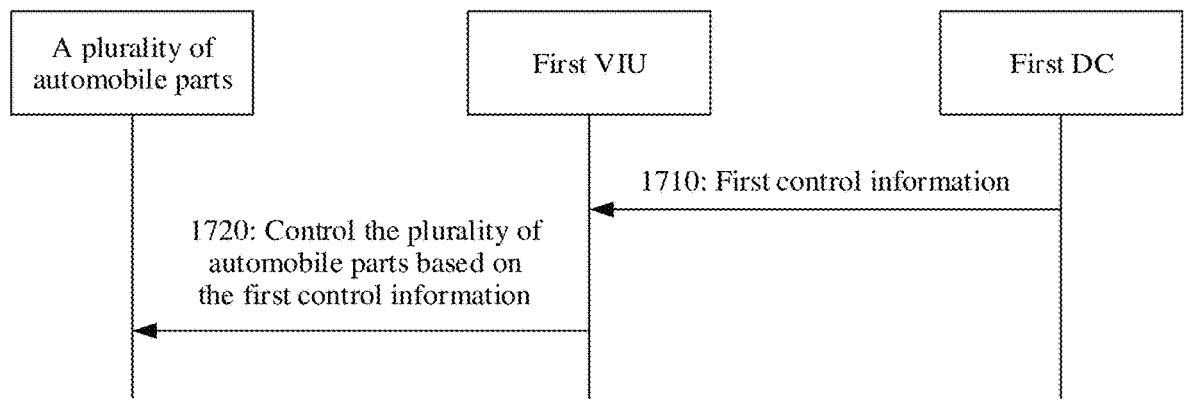
FIG. 17 is a flowchart of a control information transmission method according to at least one embodiment of this application.
Figure 18:
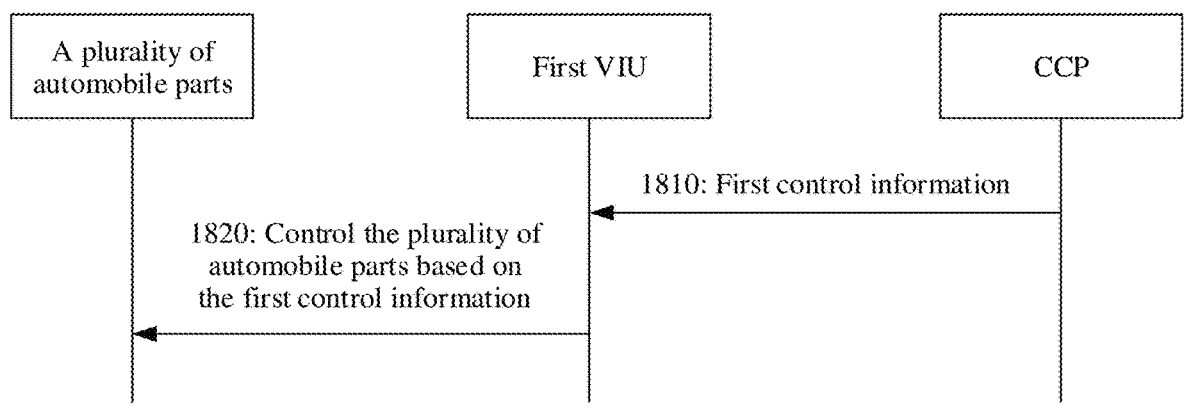
FIG. 18 is a flowchart of a control information transmission method according to at least one embodiment of this application.

The following describes a control information transmission method in at least one embodiment of this application with reference to FIG. 17 and FIG. 18 based on the systems that are for implementing the automobile electronic control function and that are shown in FIG. 3 to FIG. 16.

FIG. 17 is a flowchart of a control information transmission method according to at least one embodiment of this application. It should be understood that the method shown in FIG. 17 may be performed by any VIU in the system 300 for implementing the automobile electronic control function, and is referred to as a "first VIU" below. The method shown in FIG. 17 includes a step 1710 and a step 1720.

1710: A first VIU receives first control information sent by a first DC.

The first DC is a DC that is in communication connection with the VIU. For example, when the first VIU is the VIU 1 shown in FIG. 3, the first DC may be a DC 1 or a DC 2.

Optionally, the first control information may be generated by the first DC, or may be sent by a CCP to the first DC.

1720: The first VIU controls a plurality of automobile parts based on the first control information.

The plurality of automobile parts may be all automobile parts in the automobile, or the plurality of automobile parts may be some automobile parts in the automobile. This is not specifically limited in at least one embodiment of this application.

Optionally, when the electronic control architecture 300 includes a plurality of VIUs, to improve reliability of the electronic control architecture, a second VIU in the plurality of VIUs may provide a backup function for the first VIU.

In other words, the plurality of automobile parts are a first automobile part set, and the automobile further includes a second automobile part set. The first VIU is configured to control the first automobile part set, and the second VIU is configured to control the second automobile part set. If the second VIU fails, the first VIU is further configured to receive control information of the second automobile part set, and control automobile parts in the second automobile part set based on the control information of the second automobile part set.

Optionally, when the electronic function control architecture 300 includes a plurality of VIUs, a third VIU in the plurality of VIUs may provide a backup function for the first VIU. The backup function mainly includes: replacing the first VIU to control the plurality of automobile parts. The third VIU may be a VIU that is in the electronic function control architecture 300 and that is specially configured to provide the backup function, in other words, the third VIU generally does not control the automobile parts, and when a VIU (for example, the first VIU) in the electronic function control architecture 300 fails, the third VIU may replace the first VIU to control the plurality of automobile parts.

FIG. 18 is a flowchart of a control information transmission method according to at least one embodiment of this application. It should be understood that the method shown in FIG. 18 may be performed by any VIU in the system 400 for implementing the automobile electronic control function, and is referred to as a "first VIU" below. The method shown in FIG. 18 includes a step 1810 and a step 1820.

1810: A first VIU receives first control information sent by a CCP of an automobile.

1820: The first VIU controls a plurality of automobile parts based on the first control information.

The plurality of automobile parts may be all automobile parts in the automobile, or the plurality of automobile parts may be some automobile parts in the automobile. This is not specifically limited in at least one embodiment of this application.

Optionally, when the electronic control architecture 400 includes a plurality of VIUs, to improve reliability of the electronic control architecture, a second VIU in the plurality of VIUs may provide a backup function for the first VIU.

In other words, the plurality of automobile parts are a first automobile part set, and the automobile further includes a second automobile part set. The first VIU is configured to control the first automobile part set, and the second VIU is configured to control the second automobile part set. If the second VIU fails, the first VIU is further configured to receive control information of the second automobile part set, and control the automobile parts in the second automobile part set based on the control information of the second automobile part set.

Optionally, when the electronic function control architecture 400 includes the plurality of VIUs, a third VIU in the plurality of VIUs may provide a backup function for the first VIU. The backup function mainly includes: replacing the first VIU to control the plurality of automobile parts. The third VIU may be a VIU that is in the electronic function control architecture 400 and that is specially configured to provide the backup function, in other words, the third VIU generally does not control the automobile parts, and when a VIU (for example, the first VIU) in the electronic function control architecture 400 fails, the third VIU may replace the first VIU to control the plurality of automobile parts.

Optionally, as described above, the first VIU may be in communication connection with a plurality of DCs. For example, DCs that communicate with the first VIU includes a first DC and a second DC. The first VIU is configured to receive a second control information sent by the second DC, and the second control information is used to control some or all of the plurality of automobile parts.

In at least one embodiment of this application, the VIU is connected to the plurality of DCs, to help improve flexibility and reliability of transmitting the control information in the system for implementing the automobile electronic control function.

Figure 19:
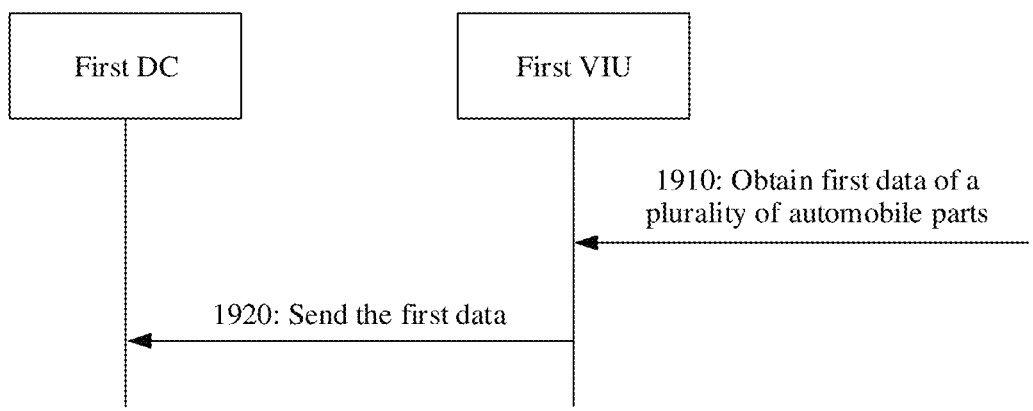
FIG. 19 is a flowchart of a data processing method according to at least one embodiment of this application.
Figure 20:
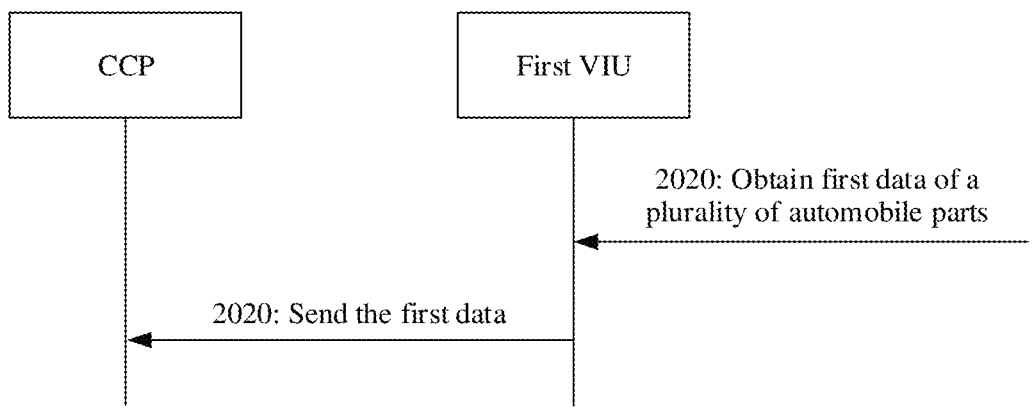
FIG. 20 is a flowchart of a data processing method according to at least one embodiment of this application.

The following describes a data transmission method in at least one embodiment of this application with reference to FIG. 19 and FIG. 20 based on the systems that are for implementing the automobile electronic control function and that are shown in FIG. 3 and FIG. 4. It should be understood that FIG. 19 and FIG. 20 may be separately used in the architectures shown in FIG. 3 and FIG. 4, or may be used in combination with the methods shown in FIG. 17 and FIG. 18. This is not limited in at least one embodiment of this application.

For ease of understanding, functions of the first VIU in the methods shown in FIG. 19 and FIG. 20 are first described. The following describes a possible function of the VIU from three aspects. It should be understood that the VIU may have one or more of the following functions.

1. An electronic control function: The VIU is used to implement some or all electronic control function provided by the ECUs inside the foregoing automobile parts. For example, the VIU has a control function required by an automobile part. For another example, the VIU has a data processing function required by an automobile part.

2. A function that is the same as that of a gateway: The VIU may further have some or all functions that are the same as those of the gateway, for example, a protocol conversion function, a protocol encapsulation and forwarding function, and a data format conversion function.

3. A data processing function across automobile parts: The VIU processes and calculates data obtained from executors (or execution elements) in a plurality of automobile parts.

It should be noted that the data in the function and "first data" and "second data" below may include running data of an executor in an automobile part. For example, the data includes a motion parameter of the executor and a working state of the executor. The data in the function may further be data collected by using a data collection unit (for example, a sensible element or sensor) of an automobile part. For example, the data may be road information of a road on which the automobile travels that is collected by using the sensible element (or sensor) of the automobile, weather information, or the like. This is not specifically limited in at least one embodiment of this application.

FIG. 19 is a flowchart of a data processing method according to at least one embodiment of this application. It should be understood that the method shown in FIG. 19 may be performed by any VIU in the system 300 for implementing the automobile electronic control function, and is referred to as a "first VIU" below. The method shown in FIG. 19 includes a step 1910 and a step 1920.

1910: A first VIU is configured to obtain first data of a plurality of automobile parts.

The first data may be data that is not processed by the first VIU. Alternatively, the first data may be obtained after the first VIU processes second data. In other words, after obtaining the second data, the first VIU processes the second data to obtain the first data. For a specific processing manner, refer to the description of the VIU function. For brevity, details are not described herein again.

Based on different types of automobile parts, manners of obtaining data by the first VIU are different. It should be understood that the "data" indicates data directly obtained by the first VIU from an automobile part. For example, the data is the second data, or may also indicate the first data when the first VIU does not process the data. The following describes three cases.

If the automobile part is an automobile part that does not include an ECU, or is an automobile part that includes only a part of an electronic control function (for example, a control function), the first VIU may directly collect the first data from sensitive elements (or sensors) of the plurality of automobile parts.

If the automobile part is an automobile part that does not include an ECU, or is an automobile part that includes only a part of an electronic control function (for example, a control function), the first VIU may directly collect the first data from execution elements of the plurality of automobile parts.

If the automobile part is an automobile part including a complete electronic control function, the first VIU may collect the first data from an ECU that implements the electronic control function.

1920: The first VIU is configured to send the first data to a first DC.

After the first VIU sends the first data to the first DC, the first DC may process the first data in an existing data processing manner, for example, data fusion. For brevity, details are not described herein.

Optionally, when the electronic function control architecture shown in FIG. 3 includes a plurality of VIUs, the first VIU may provide a backup function for a second VIU. The backup function mainly includes replacing the second VIU to provide a data processing function for the automobile parts in the second automobile part set.

In other words, the plurality of automobile parts are a first automobile part set, and the automobile further includes the second automobile part set. The first VIU is configured to provide the data processing function for the first automobile part set, the second VIU is configured to provide the data processing function for the second automobile part set, and the first VIU is configured to: if the second VIU fails, obtain data in the second automobile part set; and send the data in the second automobile part set.

Optionally, when the electronic function control architecture 300 includes a plurality of VIUs, a third VIU in the plurality of VIUs may provide a backup function for the first VIU. The backup function mainly includes replacing the first VIU to provide a data processing function for the plurality of automobile parts. The third VIU may be a VIU that is in the electronic function control architecture 300 and that is specially configured to provide the backup function, in other words, the third VIU generally does not provide the data processing service for the automobile parts, and when a VIU (for example, the first VIU) in the electronic function control architecture 400 fails, the third VIU may replace the first VIU to provide the data processing function for the plurality of automobile parts.

To improve flexibility of data transmission in the electronic control architecture, the first VIU may be in communication connection with a plurality of DCs, in other words, the first VIU is further configured to send the first data to a second DC. Correspondingly, the second DC may forward the first data to a CCP, or the second DC may further process the first data, for example, perform data fusion and calculation on the first data.

FIG. 20 is a flowchart of a data processing method according to at least one embodiment of this application. It should be understood that the method shown in FIG. 20 may be performed by any VIU in the system 400 for implementing the automobile electronic control function, and is referred to as a "first VIU" below. The method shown in FIG. 20 includes a step 2010 and a step 2020.

2010: A first VIU is configured to obtain first data of a plurality of automobile parts.

The first data may be data that is not processed by the first VIU. Alternatively, the first data may be obtained after the first VIU processes second data. In other words, after obtaining the second data, the first VIU processes the second data to obtain the first data. For a specific processing manner, refer to the description of the VIU function. For brevity, details are not described herein again.

Based on different types of automobile parts, manners of obtaining data by the first VIU are different. It should be understood that the "data" indicates data directly obtained by the first VIU from an automobile part. For example, the data is the second data, or may also indicate the first data when the first VIU does not process the data. The following describes three cases.

If the automobile part is an automobile part that does not include an ECU, or is an automobile part that includes only a part of an electronic control function (for example, a control function), the first VIU may directly collect the first data from sensitive elements (or sensors) of the plurality of automobile parts.

If the automobile part is an automobile part that does not include an ECU, or is an automobile part that includes only a part of an electronic control function (for example, control function), the first VIU may directly collect the first data from execution elements of the plurality of automobile parts.

If the automobile part is an automobile part including a complete electronic control function, the first VIU may collect the first data from an ECU that implements the electronic control function.

2020: The first VIU is configured to send the first data to a CCP.

After the first VIU sends the first data to the CCP, the CCP may process the first data in an existing data processing manner, for example, data fusion. For brevity, details are not described herein.

Optionally, when the electronic function control architecture shown in FIG. 4 includes a plurality of VIUs, the first VIU may provide a backup function for a second VIU. The backup function mainly includes replacing the second VIU to provide a data processing function for the automobile parts in the second automobile part set.

In other words, the plurality of automobile parts are a first automobile part set, and the automobile further includes the second automobile part set. The first VIU is configured to provide the data processing function for the first automobile part set, the second VIU is configured to provide the data processing function for the second automobile part set, and the first VIU is configured to: if the second VIU fails, obtain data in the second automobile part set; and send the data in the second automobile part set.

Optionally, when the electronic function control architecture 400 includes a plurality of VIUs, a third VIU in the plurality of VIUs may provide a backup function for the first VIU. The backup function mainly includes replacing the first VIU to provide a data processing function for the plurality of automobile parts. The third VIU may be a VIU that is in the electronic function control architecture 400 and that is specially configured to provide the backup function, in other words, the third VIU generally does not provide the data processing service for the automobile parts, and when a VIU (for example, the first VIU) in the electronic function control architecture 400 fails, the third VIU may replace the first VIU to provide the data processing function for the plurality of automobile parts.

The foregoing describes, with reference to FIG. 1 to FIG. 20, the system and the method for implementing the automobile electronic control function according to some embodiments of this application. The following describes, with reference to FIG. 21 and FIG. 22, a VIU according to some embodiments of this application. It should be understood that the block diagrams of the VIUs shown in FIG. 21 and FIG. 22 are applicable to any VIU in the system 300 or the system 400.

Figure 21:
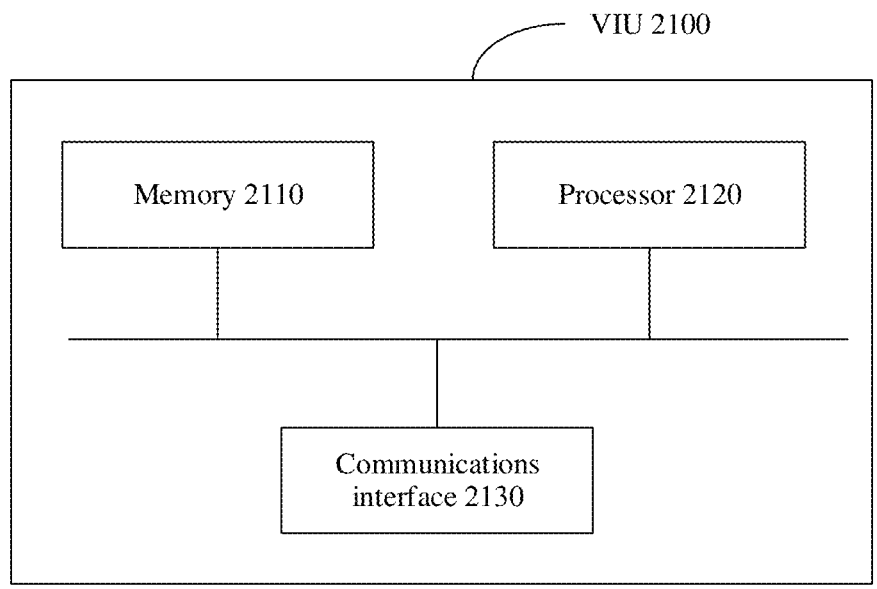
FIG. 21 is a schematic block diagram of a VIU according to at least one embodiment of this application.
Figure 22:
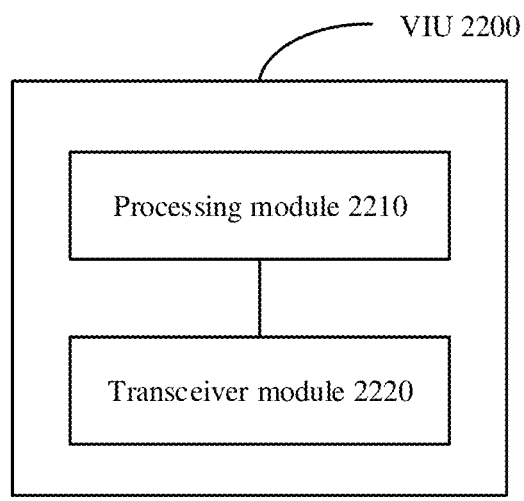
FIG. 22 is a schematic block diagram of a VIU according to at least one embodiment of this application.

FIG. 21 is a schematic block diagram of a VIU according to at least one embodiment of this application. A VIU 2100 shown in FIG. 21 may include: a memory 2110, a processor 2120, and a communications interface 2130. The memory 2110, the processor 2120, and the communications interface 2130 are connected by using an internal connection path, e.g., a bus. The memory 2110 is configured to store an instruction. The processor 2120 is configured to execute the instruction stored in the memory 2120, to control the communications interface 2130 to receive/send data or control information. Optionally, the memory 2110 may be coupled to the processor 2120 through an interface, or may be integrated with the processor 2120.

Optionally, the VIU 2100 may implement various functions implemented by the VIU in the foregoing description. For example, the communications interface 2130 may perform the operations performed by the first VIU in the step 1710 and the step 1720. For another example, the communications interface 2130 may perform the operations performed by the first VIU in the step 1810 and the step 1820. For another example, the communications interface 2130 may perform the operations performed by the first VIU in the step 1910 and the step 1920. For another example, the communications interface 2130 may perform the operations performed by the first VIU in the step 2010 and the step 2020.

It should be noted that the communications interface 2130 uses a transceiver apparatus such as but not limited to a transceiver to implement communication between the communications device 2100 and another device or a communications network. The communications interface 2130 may further include an input/output interface circuit.

In an implementation process, steps in the foregoing methods can be implemented by using a hardware integrated logical circuit in the processor 2120, or by using instructions in a form of software. The method of the communication disclosed with reference to some embodiments of this application may be directly performed by a hardware processor, or may be performed by using a combination of hardware in the processor and a software module. A software module may be located in a storage medium, such as a random access memory, a flash memory, a read-only memory, a programmable read-only memory, an electrically erasable programmable memory, or a register. The storage medium, in at least one embodiment, is located in the memory 2110, and a processor 2120 reads information in the memory 2110 and completes the steps in the foregoing methods in combination with hardware of the processor. To avoid repetition, details are not described herein again.

It should be understood that, the processor in some embodiments of this application may be a central processing unit (CPU), or may further be another general purpose processor, a digital signal processor (DSP), an application specific integrated circuit (ASIC), a field programmable gate array (FPGA), or another programmable logical device, discrete gate or transistor logical device, discrete hardware component, or the like. The general purpose processor may be a microprocessor, or the processor may be any other processor or the like.

It should also be understood that in some embodiments of this application, the memory may include a read-only memory and a random access memory, and provide an instruction and data to the processor. A part of the processor may further include a non-volatile random access memory. For example, the processor may further store information of a device type. In some embodiments, a CCP and/or a DC comprises a configuration described with respect to FIG. 21, with a memory, a processor, and a communications interface.

In at least one embodiment, the processor 2120 may be a processing module 2210, and the communications interface 2130 may be a transceiver module 2220. Details are shown in FIG. 22.

FIG. 22 is a schematic block diagram of a VIU according to at least one embodiment of this application. A VIU 2200 shown in FIG. 22 includes the processing module 2210 and the transceiver module 2220.

Optionally, the VIU 2200 may transmit the foregoing data or control information by using the transceiver module 2220, and implement the data processing function, the control function, or the like described above by using the processing module 2210. For example, the transceiver module 2220 may perform operations performed by the first VIU in the step 1710 and the step 1720. For another example, the transceiver module 2220 may perform operations performed by the first VIU in the step 1810 and the step 1820. For another example, the transceiver module 2220 may perform operations performed by the first VIU in the step 1910 and the step 1920. For another example, the transceiver module 2220 may perform operations performed by the first VIU in the step 2010 and the step 2020.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of some embodiments of this application.

A person of ordinary skill in the art may be aware that, in combination with the examples described in some embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described at least one apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of some embodiments.

In addition, functional units in some embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in some embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A system for implementing an automobile electronic control function, the system comprising:
   a first automobile part having a first electronic control unit (ECU);
   a second automobile part different from the first automobile part, the second automobile part having a second ECU different from the first ECU;
   a third automobile part different from the first automobile part and different from the second automobile part, the third automobile part having a third ECU different from the first ECU and different from the second ECU;
   a first vehicle integration unit (VIU) comprising a first processor, the first VIU being communicatively coupled with the first automobile part and the second automobile part;
   a second VIU different from the first VIU, the second VIU comprising a second processor different from the first processor, the second VIU being communicatively coupled with the third automobile part and free from being directly communicatively coupled with the first automobile part and the second automobile part;
   a first domain controller (DC) communicatively coupled with the first VIU;
   a second DC different from the first DC, the second DC being communicatively coupled with the first VIU and free from direct communication with the first DC;
   a third DC communicatively coupled with the second VIU, the third DC being free from direct communication with the first DC, the second DC and the first VIU; and
   a central computing platform (CCP) communicatively coupled with the first DC, the second DC and the third DC, the CCP being free from direct communication with the first VIU, and the second VIU,
wherein
   the first VIU is configured to perform a first electronic control function for the first automobile part and a second electronic control function for the second automobile part,
   the first ECU is configured to perform a third electronic control function for the first automobile part,
   the second ECU is configured to perform a fourth electronic control function for the second automobile part,
   the second VIU is configured to perform a fifth electronic control function for the third automobile part,
   the third ECU is configured to perform a sixth electronic control function for the third automobile part,
   the third electronic control function is part of all control functions of the first automobile part,
   the fourth electronic control function is a part of all control functions of the second automobile part,
   the sixth electronic control function is a part of all control functions of the third automobile part,
   the first VIU is configured to perform the first electronic control function for the first automobile part in response to first control information from the first DC,
   the first VIU is configured to perform the second electronic control function for the second automobile part in response to second control information from the second DC,
   the second VIU is configured to perform the fifth electronic control function for the third automobile part in response to third control information from the third DC,
   the first DC is configured to cause the first VIU to perform the first electronic control function for the first automobile part in response to receiving the first control information from the CCP,
   the second DC is configured to cause the first VIU to perform the second electronic control function for the second automobile part in response to receiving the second control information from the CCP, and
   the third DC is configured to cause the second VIU to perform the fifth electronic control function for the third automobile part in response to receiving the third control information from the CCP.

2. The system according to claim 1, further comprising:
   a fourth automobile part different from the first automobile part, different from the second automobile part, and different from the third automobile part,
wherein
   the fourth automobile part is communicatively coupled with the first VIU,
   the fourth automobile part lacks an electronic control ability, and
   the first VIU is configured to perform a seventh electronic control function for the fourth automobile part.

3. The system according to claim 1, wherein the first electronic control function is a data processing function.

4. The system according to claim 1, wherein the first electronic control function comprises some electronic control functions of the first automobile part.

5. A method of implementing an automobile electronic control function in an automobile, the method comprising:
   causing one or more of a first electronic control function for a first automobile part, a second electronic control function for a second automobile part, or a third electronic control function for a third automobile part to be performed,
wherein
   the first automobile part comprises a first electronic control unit (ECU),
   the second automobile part is different from the first automobile part and comprises a second ECU different from the first ECU,
   the third automobile part is different from the first automobile part and different from the second automobile part, and comprises a third ECU different from the first ECU and the second ECU,
   the first ECU causes the first electronic control function to be performed in response to a fourth electronic control function for the first automobile part performed by a first vehicle integration unit (VIU) communicatively coupled with the first automobile part and the second automobile part,
   the second ECU causes the second electronic control function to be performed in response to a fifth electronic control function for the second automobile part performed by the first VIU,
   the third ECU causes the third electronic control function to be performed in response to a sixth electronic control function for the third automobile part performed from a second VIU different from the first VIU and free from being directly communicatively coupled with the first automobile part and the second automobile part, in response to receiving a first control information from a central computing platform (CCP), a first domain controller (DC) communicatively coupled with the first VIU and with the CCP causes the first VIU to perform the fourth electronic control function, in response to receiving a second control information from the CCP, a second DC different from the first DC, communicatively coupled with the first VIU and with the CCP, and free from direct communication with the first DC, causes the first VIU to perform the fifth electronic control function, in response to receiving a third control information from the CCP, a third DC different from the first DC and different from the second DC, and communicatively coupled with the second VIU and with the CCP, and free from direct communication with the first VIU, the first DC, and the second DC, causes the second VIU to perform the sixth electronic control function, and the first electronic control function is part of all control functions of the first automobile part.

6. The method according to claim 5, wherein the automobile comprises a fourth automobile part different from the first automobile part, different from the second automobile part, and different from the third automobile part, the fourth automobile part is communicatively coupled with the first VIU, the fourth automobile part lacks an electronic control ability, and in response to receiving a fourth control information from the CCP, a fourth DC different from the first DC, different from the second DC and different from the third DC, communicatively coupled with the first VIU and with the CCP, and free from direct communication with the second VIU, the second DC, and the third DC, causes the first VIU to perform a seventh electronic control function for the fourth automobile part.

7. The method according to claim 5, further comprising:
obtaining, by the first VIU, first data from the first automobile part; and
sending, by the first VIU, the first data to the CCP by way of the first DC.

8. The method according to claim 5, wherein the first electronic control function is a data processing function or a logic control function.

9. The method according to claim 5, wherein the first electronic control function comprises some or all electronic control functions of the first automobile part.

10. The method according to claim 8, wherein the data processing function comprises processing data collected by a sensor associated with the first automobile part and performing data fusion on fingerprint information collected by the sensor.

11. The system according to claim 1, wherein the first electronic control function is a logic control function.

12. The system according to claim 1, wherein the first electronic control function comprises all electronic control functions of the first automobile part.

13. The system according to claim 1, wherein the first DC is associated with a first functional domain of an automobile incorporating the first automobile part, the second automobile part, and the third automobile part, and the second DC is associated with a second functional domain of the automobile different from the first functional domain.

14. The system according to claim 13, wherein the first functional domain is a self-driving domain controller and the second functional domain is a cockpit domain controller.

15. The system according to claim 14, wherein the first automobile part comprises a camera, a millimeter-wave radar system, a lidar system or an ultrasonic radar system.

16. The system according to claim 15, wherein the second automobile part comprises a head-up display, an instrument display, a radio, a navigation system, or a camera.

17. The system according to claim 13, wherein the first functional domain is a self-driving domain controller and the second functional domain is a vehicle domain controller.

18. The system according to claim 17, wherein the first automobile part comprises a camera, a millimeter-wave radar system, a lidar system or an ultrasonic radar system.

19. The system according to claim 18, wherein the second automobile part comprises a door/window lifting controller, an electric rearview mirror, an air conditioner, or a door lock.

20. The system according to claim 3, wherein the data processing function comprises processing data collected by a sensor associated with the first automobile part and performing data fusion on weather information collected by the sensor.

* * * * *